US007292990B2

(12) United States Patent
Hughes

(10) Patent No.: US 7,292,990 B2
(45) Date of Patent: Nov. 6, 2007

(54) SYSTEM AND METHOD FOR SOFTWARE DEVELOPMENT

(75) Inventor: John M. Hughes, Hebron, CT (US)

(73) Assignee: TopCoder, Inc., Glastonbury, CT (US)

( * ) Notice: Subject to any disclaimer, the term of this patent is extended or adjusted under 35 U.S.C. 154(b) by 661 days.

(21) Appl. No.: 10/408,402

(22) Filed: Apr. 7, 2003

(65) Prior Publication Data

US 2003/0192029 A1 Oct. 9, 2003

Related U.S. Application Data

(60) Provisional application No. 60/370,937, filed on Apr. 8, 2002.

(51) Int. Cl.
*G06F 9/46* (2006.01)

(52) U.S. Cl. .......................................................... 705/9

(58) Field of Classification Search ................ 717/101; 705/8, 9, 11
See application file for complete search history.

(56) References Cited

U.S. PATENT DOCUMENTS

| | | | |
|---|---|---|---|
| 4,525,599 A | 6/1985 | Curran et al. ............ 178/22.08 |
| 5,779,549 A | 7/1998 | Walker et al. ................ 463/42 |
| 5,794,207 A | 8/1998 | Walker et al. ................ 705/23 |
| 5,827,070 A | 10/1998 | Kershaw et al. ............ 434/322 |
| 5,916,024 A | 6/1999 | Von Kohorn ................ 463/40 |
| 5,933,811 A | 8/1999 | Angles et al. ................ 705/14 |
| 5,947,747 A | 9/1999 | Walker et al. ............... 434/354 |
| 6,010,403 A | 1/2000 | Adam et al. .................... 463/6 |
| 6,112,049 A | 8/2000 | Sonnenfeld ................ 434/350 |
| 6,264,560 B1 | 7/2001 | Goldberg et al. ............. 463/42 |
| 6,293,865 B1 | 9/2001 | Kelly et al. .................... 463/16 |
| 6,301,574 B1* | 10/2001 | Thomas et al. ................ 707/1 |
| 6,345,239 B1* | 2/2002 | Bowman-Amuah ............ 703/6 |
| 6,356,909 B1 | 3/2002 | Spencer ........................ 707/10 |
| 6,397,197 B1 | 5/2002 | Gindlesperger .............. 705/37 |

(Continued)

FOREIGN PATENT DOCUMENTS

JP 2000089945 A * 3/2000

(Continued)

OTHER PUBLICATIONS

"Aircraft Information Systems Support SOL 9-Bj2-Z19-1-31I DUE 061401 POC", Donald L. Ward, 2 pages Jun. 11, 1001.*

(Continued)

*Primary Examiner*—Tariq Hafiz
*Assistant Examiner*—Kalyan K. Deshpande
(74) *Attorney, Agent, or Firm*—Goodwin Procter LLP

(57) ABSTRACT

This invention relates to a method and apparatus for developing software. In one embodiment, a method for facilitating the distributed development of software components includes providing a skill rating for software developers, communicating specifications for a software component to a subset of the developers, receiving submissions from the developers, scoring the submissions, and selecting one submission to be included in a software repository. In another embodiment, a method for compensating a software developer includes soliciting software developers for the submission of computer software components, receiving software components in response to the solicitation from the developers, evaluating the received software components, selecting one or more of the submissions for potential distribution to the public, and allotting the proceeds from the distribution to the developers.

30 Claims, 16 Drawing Sheets

U.S. PATENT DOCUMENTS

| | | | | |
|---|---|---|---|---|
| 6,408,283 | B1 | 6/2002 | Alaia et al. | 705/37 |
| 6,427,132 | B1* | 7/2002 | Bowman-Amuah | 703/22 |
| 6,513,042 | B1 | 1/2003 | Anderson et al. | 707/102 |
| 6,569,012 | B2* | 5/2003 | Lydon et al. | 463/9 |
| 6,658,642 | B1* | 12/2003 | Megiddo et al. | 717/101 |
| 6,662,194 | B1* | 12/2003 | Joao | 707/104.1 |
| 6,895,382 | B1* | 5/2005 | Srinivasan et al. | 705/7 |
| 6,915,266 | B1* | 7/2005 | Saeed et al. | 705/2 |
| 7,162,433 | B1 | 1/2007 | Foroutan | |
| 2001/0032189 | A1 | 10/2001 | Powell | 705/59 |
| 2001/0034631 | A1 | 10/2001 | Kiselik | 705/8 |
| 2001/0037281 | A1 | 11/2001 | French et al. | 705/37 |
| 2001/0039529 | A1 | 11/2001 | Hoffman | 705/37 |
| 2001/0049615 | A1* | 12/2001 | Wong et al. | 705/8 |

FOREIGN PATENT DOCUMENTS

| | | | |
|---|---|---|---|
| WO | WO 97/39811 | 10/1997 | 9/24 |

OTHER PUBLICATIONS

"Forging an Outsourcing Partnership that Works", Lynda Bennet et al, IPCC 94, pp. 406-410, 1994.*
"Outsourcing of IT service Provision Issues, Concerns and Some Case Examples", Gurprett Dhillon, 20 pages, Fall 2002.*
"Managing Outsourcing of Software Development" Kerry Forsberg et al, Spring 2001, 48, pages.*
Software Acquisition Capability Maturity Model (SA-CMM_Version 1.03, Jack Cooper et al, Mar. 2002, CMU, Whole Manual.*
http://www.programmingbids.com/, Nov. 29, 2001.*
Kirsner, Scott; "The New Rules", The Boston Globe, 2001.*
U.S. Appl. No. 10/377,343, Lydon et al., filed Feb. 28, 2003.
U.S. Appl. No. 10/377,344, Lydon et al., filed Feb. 28, 2003.
U.S. Appl. No. 10/378,539, Lydon et al., filed Feb. 28, 2003.
"An Overview of PC$^2$" [online], [Retrieved on Aug. 23, 2000]. Retrieved from the Internet: http://hera.ecs.csus.edu/pc2/pc2desc.html, Revised Jun. 22, 2000.
"IOI Software Team" [online], [Retrieved on Aug. 23, 2001]. Retrieved from the Internet: http://olympiads.win.tue.nl/ioi/st/.
"Ed's Programming Contest Problem Archive" [online], [Retrieved on Aug. 23, 2000]. Retrieved from the Internet: http://www.karrels.org/Ed/ACM/index.html.
"ACM/IBM Quest for Java 2000" [online], [Retrieved on Aug. 23, 2000]. Retrieved from the Internet: http://www.acm.org/jquest/.
"JavaWorld Code Masters" [online], [Retrieved on Aug. 23, 2000]. Retrieved from the Internet: http://www.javaworld.com/javaworld/codemasters/f_index.html.
"Hack the Web for Fun!" [online], [Retrieved on Aug. 23, 2000]. Retrieved from the Internet: http://java.sun.com/contest/external/html.
"Brainbench the measure of achievement" [online], [ Retrieved on Nov. 9, 2000]. Retrieved from the Internet: http://www.brainbench.com/xml/bb/homepage.xml.
"Problem Set Archive with Online Judge" [online], [Retrieved on Nov. 8, 2001]. Retrieved from the Internet: http://acm.uva.es/problemset/.
Lewis, "Tournaments become latest high-tech recruiting tool," The Boston Globe at C1, May 6, 2002.
Annavajjala, "JAVA Challenge Software Project" Master's Thesis submitted to the Department of Computer Science and Electrical Engineering at West Virginia University.
Astrachan, "The Internet Programming Contest: A Report and Philosophy" Association for Computing Machinery, Feb. 1993.
"URCSC Computer Programming Contest" [online], [Retrieved on Jun. 26, 2002]. Retrieved from the Internet: http://www.mathcs.richmond.edu/~urcsc/contest/rules2.html.
Blecourt, "The Legacy of Arpad Elo: The Development of a Chess Rating System" University of Amsterdam, Dec. 1, 1998.
U.S. Chess Federation [online], [Retrieved on Dec. 3, 2002]. Retrieved from the Internet: http://www.uschess.org/about/about/html.
Carlton, Jim. Strutting their data, geeks go to battle for bucks and glory. Wall Street Journal, Mar. 11, 1994, col. 4, pA1(W) & pA1(e), ISSN 0193-241.
Fink, William & Joyce Dick. Computer Programming Tournament as a learning Experience. The Computer Education Quarterly. Summer 1989, vol. 11, Issue 2 pp. 46-52.
O'Sullivan, Kate. Testing recruits. Net Style. Inc. Dec. 2000, pp. 149-152.
Flipcode. Coding contest [online]. May 2000 [retrieved on Jun. 26, 2006]. Retrieved from the Internet: URL:http://www.flipcode.com/contest.shtml.
The Eiffel Stuggle 2000, Call for participation [online]. Aug. 2000, retrieved on Jun. 26, 2006. Retrieved from the Internet: URL: http://www.elj.com/eiffel/struggle2000/cfp/, entire document.
ICFP Functional Programming Contest, [online] 1998, [retrieved on Jun. 26, 2002]. Retrieved from the internet: URL: http://www.ai.mit.edu/extra/icfp-contest.
1999 ICFP Programming Contest, [online] 1999, [retrieved on Jun. 26, 2002]. Retrieved from the Internet: URL: http://www.es.virginia.edu/~jks6b/ocfp/.
"About CBDi"0 [online], [Retrieved on Jul. 29, 2003]. Retrieved from the Internet: http://www.cbdiforum.com/public/about.php3.
"ComponentSource: About Us" [online], [Retrieved on Jul. 29, 2003]. Retrieved from the Internet: http://www.componentsource.com/Marketplace/Home.asp?Type=AboutUs.
"Flashline 4 Provides Software Asset Management for Enterprise Programs" [online], [Retrieved on Jul. 30, 2003]. Retrieved from the Internet: http://www.flashline.com/fcm/fcm.jsp.
"About ComponentOne" [online], [Retrieved on Jul. 29, 2003]. Retrieved from the Internet: http://www.componentone.com/AboutComponentOne.aspx.
"Rogue Wave Corporate Information" [online], [Retrieved on Jul. 29, 2003]. Retrieved from the Internet: http://www.roguewave.com/corp/.
"LogicLibrary Company Overview" [online], [Retrieved on Jul. 29, 2003]. Retrieved from the Internet: http://www.logiclibrary.com/companyoverview.html.
"/n software inc.—General Corporate Information" [online], [Retrieved on Jul. 29, 2003]. Retrieved from the Internet: http://www.nsoftware.com/company/corporateinfo.aspx.
"ILOG Corportae Profile" [online], [Retrieved on Jul. 29, 2003]. Retrieved from the Internet: http://www.ilog.com/corporate/profile/.
"What is SourceForge.net" [online], [Retrieved on Jul. 29, 2003]. Retrieved from the Internet: http://sourceforge.net/docman/display_doc.php?docid=6025&group_id=1.
" CollabNet Corporate Background" [online], [Retrieved on Jul. 30, 2003]. Retrieved from the Internet: http://www.collab.net/media/pdfs/collabnet_background.pdf.
Office Action for US Patent No. 6,569,012 dated Jun. 27, 2002.
Office Action for US Patent No. 6,569,012 dated Aug. 21, 2002.
Final Office Action for US Patent No. 6,569,012 dated Dec. 6, 2002.
Office Action for U.S. Appl. No. 10/377,343 dated Jul. 25, 2003.
Office Action for U.S. Appl. No. 10/377,344 dated Jul. 25, 2003.
International Search Report for International Patent Application Ser. No. PCT/US03/10537 dated Jul. 23, 2003.
Web Pages from Slashdot.org: http://developers.slashdot.org/developers/04/01/26/1834209.shtml?tid=136&tud=155&tid=187 &tid=99 retrieved from the Internet on Jan. 28, 2004.
Web Pages from Scwatch.net: http://www.scwatch.net/modules.php?name=Forums&file=viewtopic&t=16 Retrieved from the Internet on Jan. 28, 2004.
"IBM Patents Method for Paying Open Source Volunteers" posted at http://www.theinquirer.net/Default.aspx?article=13813 Retrieved from the Internet on Jan. 29, 2004.
Web page www.cosource.com (Mar. 21, 2000), as provided by web.archive.org on Mar. 31, 2006 at http://web.archive.org/web/200302160316/www.cosource.com.
Weinrich and Altmann, "An Object-oriented Infrastructure for a Cooperative Software Development Environment", 1997, Linz, Austria.

Van Wegberg and Berends, "Competing communities of users and developers of computer software; competition between open source software and commercial software", May 2000, i, 1-13, University of Maastrict, The Netherlands.

Voas, "Certifying Off-the-Shelf Software Components", Jun. 1998, 53-59, Sterling, VA.

Skaf, Charoy and Godart, "Maintaining Consistency of Cooperative Software Development Activities", Vandoeuvre-les-Nancy, France.

Cooper, Jack et al. "Software Acquisition Capability Maturity Model (SA-CMM_Version 1.03)", Mar. 2002, CMU, Whole Manual.

http://www.programmingbids.com/, informational webpages retrieved from the Internet Nov. 29, 2001, 15 pages.

Kirsner, Scott, "The New Rules", http://www.topcoder.com/index?t=news_events&c=article_bglobe, downloaded from the Internet Jun. 21, 2006, 4 pages.

Phillips, Margot et al. "Programming Contests: Two Innovative Models from New Zealand", Powerpoint presentation slides printout.

Boersen, Raewyn et al. "Programming Contests: Two Innovative Models from New Zealand", text and description.

Opmanis, Martins "Possible ways to improve Olympiads in Informatics" Powerpoint presentation slides printout.

Opmanis, Martins "Possible ways to improve Olympiads in Informatics" text and description, Institute of Mathematics and Computer Science, University of Latvia, pp. 1-11.

"The Dutch Olympiad in Informatics" Powerpoint presentation slides printout.

van der Vegt, Willem, "The CodeCup, an annual game programming competition" Paper for IOI-workshop, pp. 1-11.

Dagiene, Valentina "Competition in Information Technology—learning in an attractive way", text and description, pp. 1-7.

Yakovenko, Bogdan "50% rule should be changed." pp. 1-4.

Fisher, Maryanne et al. "Gender and Programming Contests: Mitigating Exclusionary Practices" Powerpoint presentation slides printout.

Fisher, Maryanne et al. "Gender and Programming Contests: Mitigating Exclusionary Practices" text and description.

Wang, Hong et al. "Visualization, Antagonism and Opening—Towards the Future of the IOI Contest" for 1st Workshop on Computer Science Competitions Reform, Tsinghua University, Beijing, China.

Forisek, Michal "On suitability of programming competition tasks for automated testing" Powerpoint presentation slides printout, 11 pages.

Forisek, Michal "On suitability of programming competition tasks for automated testing" text and description, pp. 1-9.

Cormack, Gordon et al. "Structure, Scoring and Purpose of Computing Competition", text and description, University of Waterloo.

Pohl, Wolfgang, Suggestions for CS Competitions (Task, Exam, Automatic Grading) text and description, Dagstuhl, Germany, Jan. 24, 2006.

Pohl, Wolfgang, "Classification of Computer Science Competitions" text and description, Dagstuhl, Germany, Jan. 23, 2006.

Pohl, Wolfgang, "Computer Science Competitions for High School Students—Approaches to Classification and New Task Types", text and description, 8 pages.

Pohl, Wolfgang, "Computer Science Competitions for High School Students—Approaches to Classification and New Task Types", Extended Abstract, 7 pages.

Manzoor, Shahriar "Analyzing Programming Contest Statistics" (http://online-judge.uva.es/contest/) Southeast University, Dhaka, Bangladesh.

Manzoor, Shahriar "Analyzing Programming Contest Statistics" (http://online-judge.uva.es/p) Southeast University, Dhaka, Bangladesh.

Verhoeff, Tom "The IOI Is (Not) a Science Olympiad", Powerpoint presentation slides printout, Jan. 24, 2006, The Netherlands.

Verhoeff, Tom "The IOI Is (Not) a Science Olympiad", text and description, Oct. 2005, The Netherlands, 9 pages.

Michalski, Marcin et al. "Plug & Play Contest System" (SIO.NET), Basic guidelines sheet, Institute of Informatics, Warsaw University, Poland.

Michalski, Marcin et al. "Plug & Play Contest System" (SIO.NET), text and description, Institute of Informatics, Warsaw University, Poland.

Cormack, Gordon "Random Factors in IOI Test Case Selection" text and description, University of Waterloo, Ontario, Canada.

Cormack, Gordon, "Statistical Analysis of IOI Scoring" Brief description.

Cormack, Gordon "Statistical Analysis of IOI Scoring" Powerpoint presentation slides printout, Jan. 24, 2006.

Retrieved from the Internet, http://www.bwinf.de/competition-workshop/ information sheet, Jul. 12, 2006.

Retrieved from the Internet, http://www.bwinf.de/competition-workshop/papers.html, listing of accepted papers, Jul. 12, 2006.

Programming bids Buyers Request Programmers Bid—Retrieved from the internet, http://rfq.programmingbids.com/cgi-bin/rfq/feedback.cgi?p=mamoon Feedback provided by buyers by username mamoon, downloaded Aug. 8, 2006.

Top Coder Homepage (as of May 16, 2001) retrieved from the Internet, http://web.archive.org/web/20010516213901/http://www.topcoder.com, downloaded Oct. 19, 2006.

* cited by examiner

SYSTEM AND METHOD FOR SOFTWARE DEVELOPMENT

CROSS-REFERENCE TO RELATED APPLICATIONS

This application claims priority to U.S. provisional patent application Ser. No. 60/370,937, filed Apr. 8, 2002.

TECHNICAL FIELD

This invention relates to computer-based methods and systems for developing and distributing software and, more particularly, to methods and systems facilitating the distributed development of software.

BACKGROUND INFORMATION

In the United States and elsewhere, computers have become part of people's everyday lives, both in the workplace and in personal endeavors. This is because a general-purpose computer can be programmed to run a variety of software programs each providing different processing and networking functions. Computer programmers develop computer code. Some companies hire large numbers of computer programmers to develop code on the company's behalf.

One approach is to hire large numbers of programmers and develop software "in house." While this affords significant control over the programming staff, finding, hiring, and maintaining such a staff can be cost prohibitive. Furthermore, as individual programmers leave the company, much of the technical and industrial knowledge is also lost. Alternatively, many companies "outsource" their programming through consulting firms, or contract employees. This approach relieves the company of the burdens of managing individual employees, however the quality of the work is often suspect, and the challenges of integrating work from numerous outside vendors can be significant.

SUMMARY OF THE INVENTION

There is a need for ways for organizations to obtain high-quality software without maintaining a large, permanent software development organization. Techniques that have been suggested to improve software development are code re-use and component-based design. But even if organizations adopt such techniques, they still need to obtain high-quality components in an affordable manner.

In general, the invention relates to motivating a group of distributed software developers, otherwise unrelated to each other, to participate in the distributed development of high-quality software. Generally, the motivation for the developers results from financial and competitive incentives. The independence of the developers allows for enforcement of rigorous design and quality analysis, which in turn results in very high quality (e.g., enterprise quality) software.

In one aspect, a product manager communicates a specification for a software program to the group of developers, who may be software architects, designers, coders, or the like. The product manager receives one or more submissions in response to the communicated specification. Each submission is scored, at least in part based on the degree to which the submission satisfies the communicated specification. One of the submissions is selected, responsive to the score, for inclusion in a software repository for distribution to the public. Royalties can be allocated to the developers who submitted the designs or code that is included in the repository. It should be understood that the software program can be any sort of program, including for example without limitation, a component, a class, a library, an application, or some combination or collection of one or more of these.

Various embodiments can include one or more of the following features. The ratings assigned to a developer can be derived from the developer's performances in one or more coding competitions, which in turn can be held online. The ratings assigned to a developer can be derived from the developer's prior submissions of designs for software programs. The ratings assigned to a developer can be derived from the developer's prior submissions of software programs. The specifications sent to the developers can be for the design of a software program. The specifications sent to the developers can be for the development of a software program. The software program can be a software component. The software program can be one of a software application, a combination of one or more software components, or a software module. The ratings derived for a developer can be used to determine the subset of programmers that should receive the specifications. The existence of a rating for a developer can determine if the developer is included in the subset of programmers that should receive the specifications. The developers can submit a design for a software program. The developers can submit computer code for a software program. The developer can be a software designer. The developer can be software programmer. The score for a submission can be derived based on the submission being reviewed by a developer other than the developer who submitted the submission. The submission can be selected for inclusion into the software repository based on receiving a minimum score. The submissions included in the software repository can be certified to operate in computing environments different from the computing environment used for the original submission.

In general, another aspect of the invention relates to compensating developers for the design or development of software programs. A method includes soliciting multiple developers for submissions of software programs, receiving at least one software program in response to the solicitation, scoring the received responses, selecting a software program for distribution to the public based on the score, distributing the program to the public, and allocating a portion of the revenue received from the distribution of the program to the developer who submitted the selected design or the code for the program.

Embodiments can include one or more of the following features. Prior to soliciting the developers, rating the developers. The developers can be rated based on their performance in an online coding competition. The developers can be rated based on their prior submissions of a design for a software program. The developers can be rated based on their prior submissions of a software program. The software program can be a software component. The software program can be a software application, a combination of software components, or a software module. Instead, or in addition, the programmers can be solicited at least in part based on their rating, or having a rating. The allocation of proceeds from the distribution of the program can be based at least in part on the rating of the developers. The allocation of proceeds from the distribution of the program can be based at least in part on the number of hours a developer spent developing the software program and/or based on the proportion of work contributed by the developer. The allocation of proceeds from the distribution of the program can be based at least in part on the number of times and/or to whom the software program is distributed.

In yet another aspect, the invention relates to systems for implementing the methods just described. For example, a system for facilitating the distributed development of software programs includes a rating engine for rating the skills of software developers, and a server for communicating software specifications to developers who have been previously rated by the rating engine. The system further includes a server for receiving software programs as they are submitted from the developers, and a module for scoring the submitted software programs.

In one embodiment of this aspect of the invention, the system can also include a reviewing module to allow developers to review submissions submitted by other developers and/or scorecards produced by the review board. The system can also include a repository for storing the software programs along with all associated design documents. The repository can include an online showroom to display the programs, and can also include sample applications built using the submitted software programs. The repository can also include a module for demonstrating the functionality of the software programs to the public.

In another embodiment of the invention, the system can also include a calculation module for allocating revenue among programmers who have previously submitted software programs. The allocation of revenue can be based, at least in part, on the ratings of the programmers. The allocation of revenue can be based, at least in part, on the number of hours the programmers spent designing or developing the software program. The allocation of revenue can be based, for example, at least in part on the number of times and/or to whom the software program is distributed.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
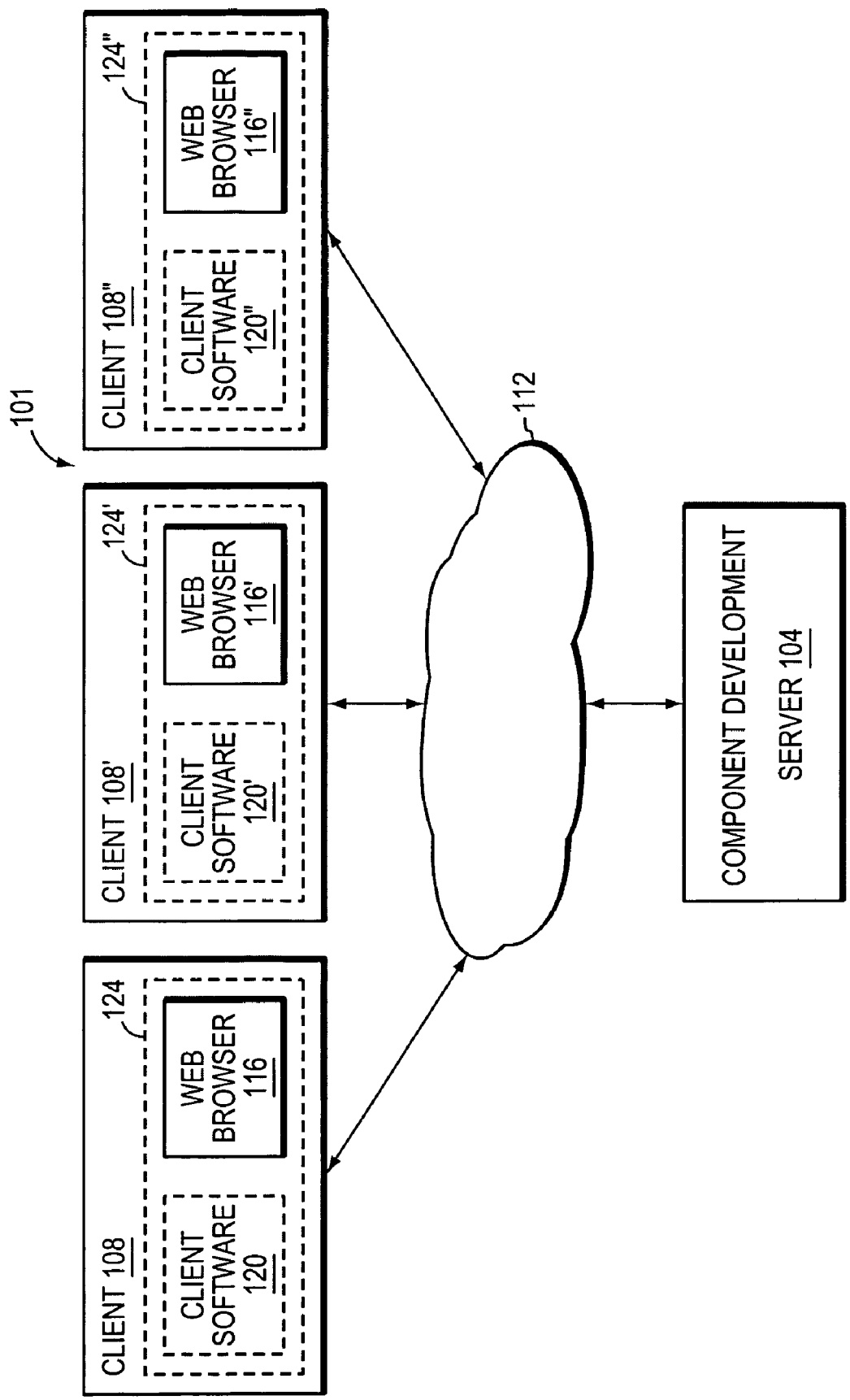
FIG. 1 is a block diagram of an embodiment of a distributed software development system having a server according to the invention.

Referring to FIG. 1, in one embodiment, a distributed software development system 101 includes at least one server 104, and at least one client 108, 108', 108", generally 108. As shown, the distributed software development system 101 includes three clients 108, 108', 108", but this is only for exemplary purposes, and it is intended that there can be any number of clients 108. The client 108 is preferably implemented as software running on a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and GNU/Linux from RED HAT, INC. of Durham, N.C. (and others). The client 108 could also be implemented on such hardware as a smart or dumb terminal, network computer, wireless device, information appliance, workstation, minicomputer, mainframe computer, or other computing device, that is operated as a general purpose computer or a special purpose hardware device solely used for serving as a client 108 in the distributed software development system 101.

Generally, in some embodiments clients 108 can be operated by software developers and are used by software developers to participate in software development. Clients 108 can also be operated by customers of the software developed by the software developers. In various embodiments, the client computer 108 includes a web browser 116, client software 120, or both. The web browser 116 allows the client 108 to request a web page (e.g. from the server 104) with a web page request. An example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client 108 manually requests a web page from the server 104. Alternatively, the client 108 automatically makes requests with the web browser 116. Examples of commercially available web browser software 116 are INTERNET EXPLORER, offered by Microsoft Corporation of Redmond, Wash., and NETSCAPE NAVIGATOR, offered by Netscape Communications Corporation of Mountain View, Calif.

In some embodiments, the client 108 also includes client software 120. The client software 120 provides functionality to the client 108 that allows a software developer to participate in a coding competition. The client software 120 may be implemented in various forms, for example, it may be in the form of a Java applet that is downloaded to the client 108 and runs in conjunction with the web browser 116, or the client software 120 may be in the form of a standalone application, implemented in a multi-platform language such as Java or in native processor executable code. In one embodiment, if executing on the client 108, the client software 120 opens a network connection to the server 104 over the communications network 112 and communicates via that connection to the server 104. The client software 120 and the web browser 116 may be part of a single client-server interface 124; for example, the client software can be implemented as a "plug-in" to the web browser 116.

A communications network 112 connects the client 108 with the server 104. The communication may take place via any media such as standard telephone lines, LAN or WAN links (e.g., T1, T3, 56 kb, X.25), broadband connections (ISDN, Frame Relay, ATM), wireless links, and so on. Preferably, the network 112 can carry TCP/IP protocol communications, and HTTP/HTTPS requests made by the web browser 116 and the connection between the client software 120 and the server 104 can be communicated over such TCP/IP networks. The type of network is not a limitation, however, and any suitable network may be used. Typical examples of networks that can serve as the communications network 112 include a wireless or wired ethernet-based intranet, a local or wide-area network (LAN or WAN), and/or the global communications network known as the Internet, which may accommodate many different communications media and protocols.

The servers 104 interact with clients 108. The server 104 is preferably implemented on one or more server class computers that have sufficient memory, data storage, and processing power and that run a server class operating system (e.g. SUN Solaris, GNU/Linux, MICROSOFT WINDOWS NT). Other types of system hardware and software than that described here could also be used, depending on the capacity of the device and the number of users and the size of the user base. For example, the server 104 may be part of a server farm or server network, which is a logical group of one or more servers. As another example, there could be multiple servers 104 that may be associated or connected with each other, or multiple servers could operate independently, but with shared data. In a further embodiment and as is typical in large-scale systems, application software could be implemented in components, with different components running on different server computers, on the same server, or some combination.

The server 104 can include a contest server, as described in co-pending U.S. patent application Ser. No. 10/041,393, entitled "Systems and Methods for Coding Competitions," by Lydon et al.

In one embodiment, the server 104 enables the distributed software development of a software program by a virtual development team. The software program can be any sort of instructions for a machine, including, for example, without limitation, a component, a class, a library, an application, an applet, a logic table, a data block, or any combination or collection of one or more of any one or more of these. In one embodiment, the software program is a software component. Generally, a software component is a functional software module that may be a reusable building block of an application. Just as a few examples, software components include, but are not limited to, such components as a graphical user interface, a small interest calculator, an interface to a database manager, calculations for actuarial tables, a DNA search function, an interface to a manufacturing numerical control machine for the purpose of machining manufactured parts, a public/private key encryption algorithm, and functions for login and communication with a host application (e.g., insurance adjustment and point of sale (POS) product tracking). In some embodiments, components communicate with each other for needed services (e.g., over the communications network 112). A specific example of a component is a JavaBean, which is a component written in the Java programming language. A component can also be written in any other language, including without limitation Visual Basic, C++, Java, and C#.

In one embodiment, the software program is an application. In some embodiments, he application can is comprised of one or more software components. In one embodiment, the software application is comprised of software components previously developed using the methods described below. In some embodiments, the application comprises entirely new software programs. In some embodiments, the application comprises a combination of new software programs and previously developed software components.

Figure 2:
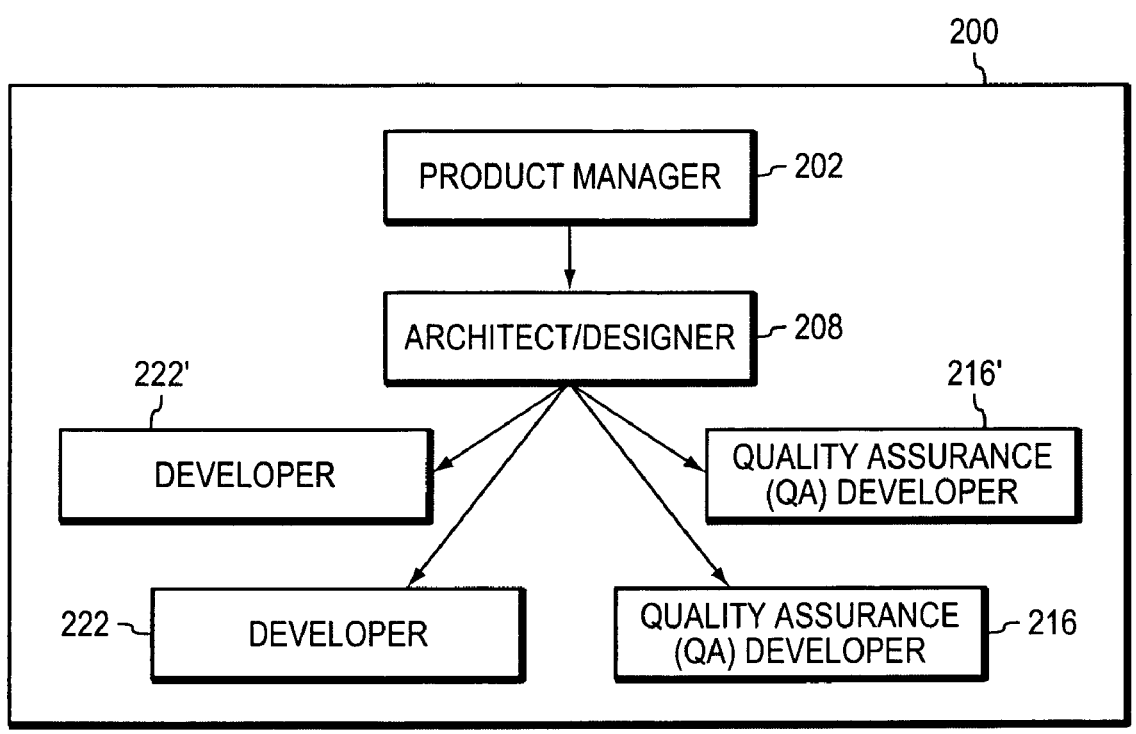
FIG. 2 is a block diagram of one embodiment of a distributed software development team according to the invention.

Referring to FIG. 2, a software development team can be used to develop software components. In one embodiment, the software development team 200 includes a product manager 202. The product manager 202 is the manager for the development and deployment of a component. The product manager 202 can perform market research to identify a component that is potentially useful to a market. For example, the product manager 202 can perform research in an industry to determine if companies would find useful a component that has certain characteristics, and specify the requirements for such a component. The product manager 202 can also specify (without limitation) items such as the cost of the project, the project schedule, and the project risks. In one embodiment, the product manager 202 creates a project plan for the project, which may include an estimated project cost and schedule and a requirements document describing the scope and risks of the project.

An architect (also referred to as a "designer") 208 designs the software component. The architect 208 preferably is a senior developer who acts as a mentor to and collaborates with one or more of the other team members 204, 212, 216 to design the architecture of the component. The architect 208 can also create test cases that meet the requirements for the component as described by the product manager 202, for example in a requirements document, or by other communication with the product manager 202. The architect 208 preferably designs the component in a manner that maximizes the potential re-use of the software component. The architect 208 may therefore base the design of the software component on, for instance but not limited to, the number of interfaces available, the compatibility of the component to other components, and the speed of execution of each design of the component.

One or more QA developer(s) 216, 216' (generally, 216) then develops a test plan for the component. The test plan can include normal and extreme input to simulate production and stress. In one embodiment, a QA developer 216 develops the test plan using the requirements specification written by the product manager 202, and the design specification written by the architect 208. The QA developer 216 attempts to identify potential problem areas in the specification and tailor the QA testing towards one or more of those areas. Moreover, the QA developer 216 may communicate with the other team members to improve or discuss the test plan. Once it is complete, the test plan can be reviewed by the architect 208 and/or the product manager 202, to verify that the test plan will adequately test the component requirements.

One or more developer(s) 222, 222' (generally, 222) then develops a component to meet the requirements described by the specification. In one embodiment, the developer 222 submits an object model to the architect 208, such as a model in the Unified Modeling Language (UML). Once the architect 208 approves the object model, the developer 222 develops the code to implement the component. The developer uses the test plan to confirm that the code as implemented meets the requirements. When the developer 222 completes the code, the architect 208 and/or product manager 202 review the code. In one embodiment, the architect 208 reviews the code, for example but not limited to, to confirm functionality, style, adherence to coding standards, performance, and stability.

Once the component is developed, the QA developer 216 tests the completed component, and verifies that it is acceptable, according to the test plan.

Although the software development team 200 shown in the figure includes one product manager 202, one architect 208, two QA developers 216, 216', and two developers 222, 222' it will be understood that this is only for exemplary purposes and the number of developers 222 and QA developers 216 will depend on the particular project. It should also be understood that one or more of the members of the software development team 200 can operate one or more clients 108 and communicate with the server 104 via the communications network 112 as shown in FIG. 1.

In some embodiments, the software development team 200 is comprised of developers with no relationship to each other. For example, the developers 222 may not know (or if they do know each other, be very familiar with), the QA developers 216, or the product manager 202. One advantage to this particular embodiment is the developers are more willing to participate in unbiased peer review of the software design or component developed by another. Further, in some embodiments, the review process can be kept anonymous, so that the developers do not know whose work they are reviewing. Reviewing work of the development team 200 in this manner, with adherence to a strict development procedure, greatly enhances the quality of the final product. In one embodiment, the peer review process is implemented with a development environment residing on the server, 104. In another embodiment, other sorts of development environments are used, for example, the peer review can done using the individual developer's computer.

Figure 3:
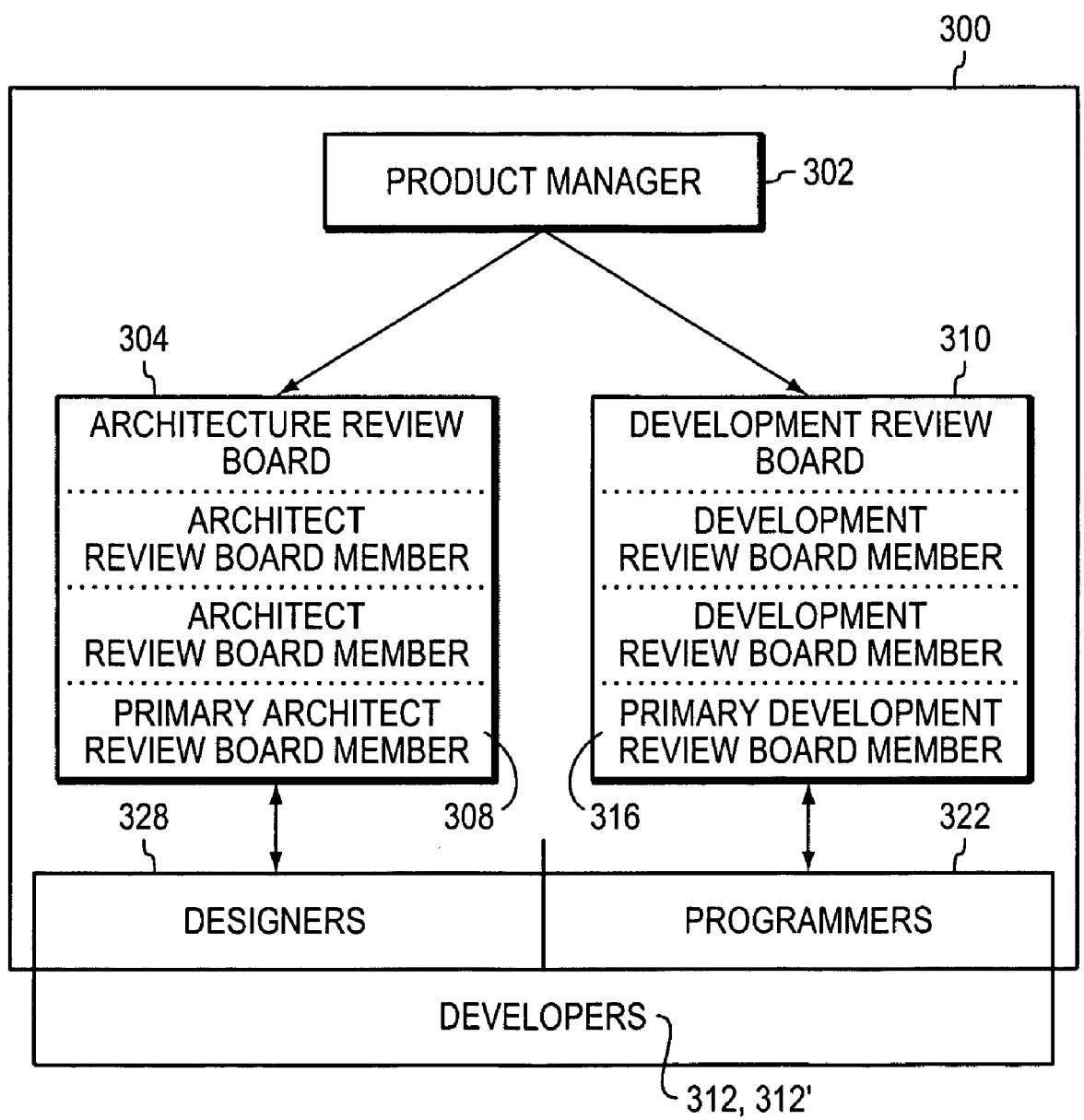
FIG. 3 is a block diagram of a second embodiment of a distributed software development team according to the invention.

Referring now to FIG. 3, in a variation of the embodiment of FIG. 2, the product manager 302 moderates a development team 300, which is formed from an distributed group of developers (used here to include designers, design reviewers, developers, development reviewers, etc.). For example, the designers and developers can be members of an organization or a community dedicated to collaborative computer programming and distributed software development. In one embodiment, the product manager 302 facilitates an initial discussion among such a group of developers, which can include potential or actual development team members 300. The discussion can be a collaboration to identify requirements for a new or improved software component to be developed. In some embodiments, the discussion takes place in an online forum, which is can be accessed by developers in a development community. In one embodiment, participation in such forums is encouraged by selecting participants for architecture/design 304 and development 310 boards from those who meet other criteria and participate in such discussions.

Developers 312 can request inclusion on the development team 300, the product manager 302 can invite developers 312 to join the development team 300, or some combination. In some embodiments, the product manager 302 creates an incentive for developers 312 to participate in the development team by providing monetary compensation or awards for developers 312 who provide quality submissions. In some embodiments, the product manager 302 creates incentive to developers 312 to participate by fostering competition among the developers 312. For example, in some embodiments, the developers 312 receive increased ratings by participating in certain development teams.

The development team 300 includes an architecture review board 304. The architecture review board 304 includes one or more developers 312 who review design submissions from software designers 328. The architecture review board preferably has a small number of (e.g., less than ten) members, for example, three members, but can be any number. Generally, the review board is formed for only one or a small number of related projects. Review boards, in some embodiments, could be formed for an extended time, but it is also possible that changes in staffing could help maintain quality.

Preferably, one of the architecture review board members is selected, by the product manager 302, the architecture review board 304, or otherwise, to be a primary review board member 308. If the board 304 is instituted for an extended time, typically, the primary review board member 308 is assigned for each component or related group of components, but the primary review board member 308 also can be the same for all components reviewed by that board 304, depending on the availability and skills of the members. The primary review board member 308 is responsible for coordination and management of the activities of the board 304.

In one embodiment, submissions for component designs meeting a particular specification are requested by the product manager 302, and the design submissions made by designers 328 are judged by the architecture review board 304. The primary review board member 308 screens the design submissions before they are reviewed by the other members of the architecture review board 304, to allow the rest of the review board to judge only the best of the submissions. In some embodiments, the screening process includes scoring the submissions based on the degree to which they meet the requirements outlined in the specification. In some embodiments, scores are documented using a scorecard, which can be a document, spreadsheet, online form, database, or other electronic document.

In one embodiment, the primary review board member 308 informs the architecture review board 304 that one or more submissions have passed the screening process, and the architecture review board 304 review the design submissions. In some embodiments, the architecture review board 304 reviews the submissions based on requirements documented in the specification. In some embodiments, the architecture review board 304 scores the submissions. In some embodiments, the scores are documented using a scorecard, which can be a document, spreadsheet, online form, database, or other electronic document.

In some embodiments, the scores and reviews from the primary review board member 308 and the other members of the architecture review board 304 are aggregated into a final review and score. In some embodiments, the aggregation can comprise compiling information contained in one or more documents. Such aggregation can be performed by the, the primary review board member 308, the other members of the architecture review board 304 or in one exemplary embodiment, the aggregation is performed using a computer-based system which resides on the server 104 (FIG. 1). In some embodiments, the product manager 302 resolves discrepancies or disagreements among the architecture review board 304.

In one embodiment, the design with the highest combined score is selected as the winning design that will be used for implementation. A prize and/or recognition is given to the designer. In one embodiment, a portion of the payment to the designer is withheld until the end of the development review. For example, the designer may receive 75% of the payment and the end of the design review, and 25% is paid after the development review. There can also be prizes and/or recognition for the other submitted designs.

In some embodiments, in addition to reviewing the submissions, the architecture review board 304 can identify useful modifications to the specification or the design that should be included into the design. The primary review board member 308 documents the additional requirements, and communicates this information to the designer 328 who submitted the design. In one embodiment, the primary review board member 308 aggregates the comments from the review board 304. The designer 328 can update the design and resubmit it for review by the architecture review board 304. This process can repeat until the primary review board member 308 believes the design has met all the necessary requirements.

Once the architecture review board 304 validates that a design has sufficiently addressed the requirements of the specification, the primary review board member 308 notifies the product manager 302 that such a design has passed the design review process. The product manager 302 can then use the design to solicit submissions for software components that meet the specifications of the design. For example, the product manager 302 can make the design available on a web site or mailing list for implementation. The product manager 302 requests implemented components according to the design.

The development team 300 also includes a development review board 310 that is analogous to the architecture review board 304. The development review board can be formed once the design is complete and selected, or can be selected at a different time, for example, at the time that the architecture review board 304 is formed. The membership of the development review board 310 can be the same as, or overlap with, the membership of the design review board 304, although this may not be as desirable from a quality maintenance point of view. In some embodiments, the development review board 310 is not selected until the submissions for the development project are received.

The development review board 310 includes one or more developers 312 who review development submissions from software programmers 322. The development review board 310 preferably has a small number of (e.g., less than ten) members, for example, three members, but can be any number. Generally, the development review board 310 is formed for only one or a small number of related projects. Review boards, in some embodiments, could be formed for an extended time, but a change in staffing (and continued competition for review board slots) could help maintain quality.

Preferably, one of the development review board 310 members is selected, by the product manager 302, the development review board 310, or otherwise, to be a primary development review board member 316. If the board 310 is instituted for an extended time, typically, one of the development board members 310 is assigned to be the primary development review board member 316, and is assigned for each component or related group of components, but the primary development review board member 316 also can be the same for all components reviewed by that board 310, depending on the availability and skills of the members. The primary development review board member 316 is responsible for coordination and management of the activities of the board 310.

In one embodiment, the primary development review board member 316 screens submitted components before the submissions are reviewed by the other members of the development review board 310. In some embodiments, the screening process includes scoring the submissions based on the degree to which they meet the requirements outlined in the design specifications. In some embodiments, the scores are documented using a scorecard. The scorecard can be a document, spreadsheet, online form, database, or other electronic document.

In one embodiment, the primary development review board member 316 informs the other development review board members 310 that one or more submissions have passed the screening process. In one embodiment, the members of the development review board 310 review the submitted components. In some embodiments, the primary development review board member 316 reviews the submissions based on the detailed requirements documented in the design document described above. In some embodiments, the development review board 310 scores the submissions. In some embodiments, the scores are documented using a scorecard. The scorecard can be a document, spreadsheet, online form, database, or other electronic document.

In some embodiments, the score can be based on how the component performs in one or more test cases. In some embodiments, the test cases can include tests to determine the accuracy of the results received when the component is provided with valid input data. In some embodiments, the test cases can include tests to determine if the component behaves correctly when provided with invalid input data. In some embodiments, the test cases can include tests that determine how the component responds to a large quantity of input data.

In some embodiments, the scores and reviews from the primary development review board member 316 and the development review board 310 are aggregated into a final review. In some embodiments, the aggregation can comprise compiling information contained in one or more documents. In one embodiment, the product manager 302 aggregates the information. In some embodiments, the primary development review board member 316 aggregates the information. In one exemplary embodiment, the aggregation is done using a computer program, which in turn can reside on the server 104. In some embodiments, the product manager 302 resolves discrepancies or disagreements among the development review board members 310.

Once the development review board 310 validates that a implemented component meets the requirements of the specification, and is of sufficient quality, the primary development review board member 316 notifies the product manager 302 that the component has completed the development review process. In one embodiment, the implementation with the highest aggregate score is selected as the winning component that will be used. A prize and/or other recognition is given to the programmer. There can also be prizes and/or recognition for runners-up. The winning component can then be included in a software repository, for access and use by other programmers. As discussed further below, the participants in the design and implementation of the components can be paid commensurate with their contribution as a percentage of revenue for the use of the developed component.

In some embodiments, members of the development review board 310 can identify modifications to the implementation that should be included in the component. The primary development review board member 316 documents the additional requirements, so that the programmer 322 can update and resubmit. This process can repeat until the primary development review board member 316 believes the component is complete.

Figure 4:
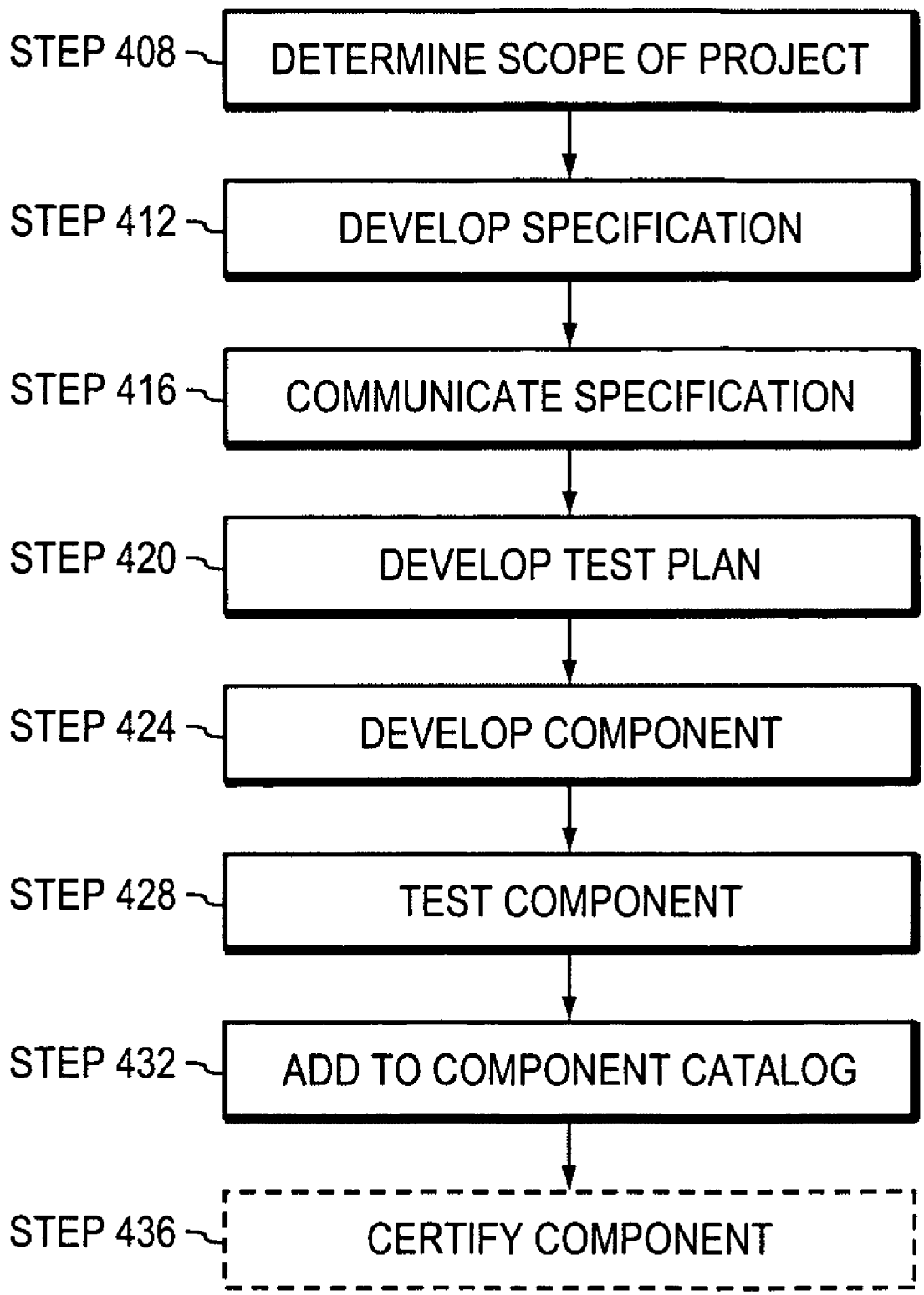
FIG. 4 is a flow chart of an embodiment of the steps performed by the virtual software development team when developing a software program according to the invention.

Referring also to FIG. 4, in one embodiment, the product manager 302 determines the scope of a development project (STEP 408), as described above. The project manager 302 (possibly in coordination with the architect 308) generates a specification of the component, components, or application to be developed, as well as a development timeline and budget (STEP 412).

In one embodiment, the product manager 302 moderates a collaborative forum to determine the scope of potential development projects. In some embodiments, the information can be ideas for new software components, and in some embodiments, the information can be additional requirements for existing software components. In some embodiments, the information can be ides for software applications that are comprised of a combination of previously developed software components. The collaborative forum can consist of developers, customers, prospective customers, or others interested in the development of software components. In one embodiment, the collaboration forum is an online forum where participants can post ideas, questions, suggestions, or other information. In some embodiments, only a subset of the forum members can post suggestions to the forum. Once the product manager 302 determines the necessary requirements for the software component are collected, the product manager 302 can create the requirements specification for the component. The product manager 302 optionally can terminate the collaboration forum at that time.

In one embodiment, the specification defines the business plan and a stable hardware and/or software platform, or other architectural constraints. For example, the specification can define the network devices, servers, and general infrastructure to support the development and production of the project and product. The specification can also identify the language that the component must be programmed in, a functional overview of the software component, boundary conditions, efficiency requirements, computer platform requirements, interface requirements, performance criteria, test-case requirements, and/or documentation requirements of the component. In some embodiments, the specification can include an amount of money that will be paid to the designer who submits the best design.

Once the specification is completed, the product manager 302 communicates the specification to the other team members (STEP 416). This communication can occur over the communications network 112 (FIG. 1), such as via an email message, a posting on a web page accessible by the web browser 116, through a news group, facsimile, or other communication. The product manager 302 can communicate with the architect 208 and/or any other team members 212, 216 to obtain comments and/or suggestions to the specification. In one embodiment, the product manager 302 communicates the specification to one or more members of the development review board 310. In one embodiment, the development review board 310 selects the primary development review board member 316 according to the methods described above. The development review board can also review (and in some embodiments, select) the work of the primary development review board member 316. The primary development review board member 316 then develops a test plan for the component (STEP 420), as described above. The programmer 322 then develops a component that meets all requirements described by the specification (STEP 424). Once the component is developed, the primary development review board member 316 tests the completed component (STEP 428). If the software component passes the testing by the primary development review board member 316 (and in some embodiments the primary architect review board member 308 and/or the product manager 302), the component is added to a component catalog (STEP 432).

In one embodiment, the product manager 302 can have a component certified to operate in multiple computing environments (STEP 436), where the computing environment might include variations or combinations of hardware platforms, operating systems, application servers, networking protocols, database management systems, and so on. For example, it might be beneficial to have a software component developed to operate on a Intel-based PC running WINDOWS 2000 Server and a SQLServer database certified to operate on a SUN Solaris server with an Oracle database. The certification can be done by a rated development member that is part of a certification pool. The certification pool has access to the server 104 in order to test components on multiple platform combinations. In some embodiments, the certification pool comprises developers that are selected to certify components, and they are compensated a nominal amount for each certification completed. The developers selected can be the developers used for development or other developers.

In one embodiment the primary architecture review board member 308 tests the functionality of the component and reviews the deliverables produced by the development team 200, such as the source code and documentation. Furthermore, the primary architecture review board member 308 can communicate a final approval to the product manager 302 if the component sufficiently passes the architect's tests. The product manager 302 can also verify the deliverables for herself before approving them for the component catalog. In some embodiments, the component can be reviewed by a developer other than the developer who submitted the component.

Moreover, in some embodiments, the component is scored based on how well the component performed in the various tests that the development team 300 applied to the component. For instance, the product manager 302 can use the server 104 (FIG. 1) to subject the component to one or more tests that target the contribution of each member of the development team 300. Using the results of these targeted tests, the product manager 302 (e.g., using the server 104) can obtain a component development score for each team member, which can then be used to determine whether such team member will be used for a subsequent component development project. The rating of a team member is an ongoing process that includes, but is not limited to, performance of components, on time delivery, task fulfillment, and validity of deliverables.

The development team 300 may then determine that if the component has not scored above a predetermined amount, the component is not added to the component catalog. In one embodiment, if the component is not added, members of the development team 300 (e.g., developers 322) are not compensated as highly for their work on the component as if the component obtained a higher score. Compensation may be in the form of, for instance, monetary compensation, vacations, tangible objects, intangible objects, or any combination thereof.

Figure 5:
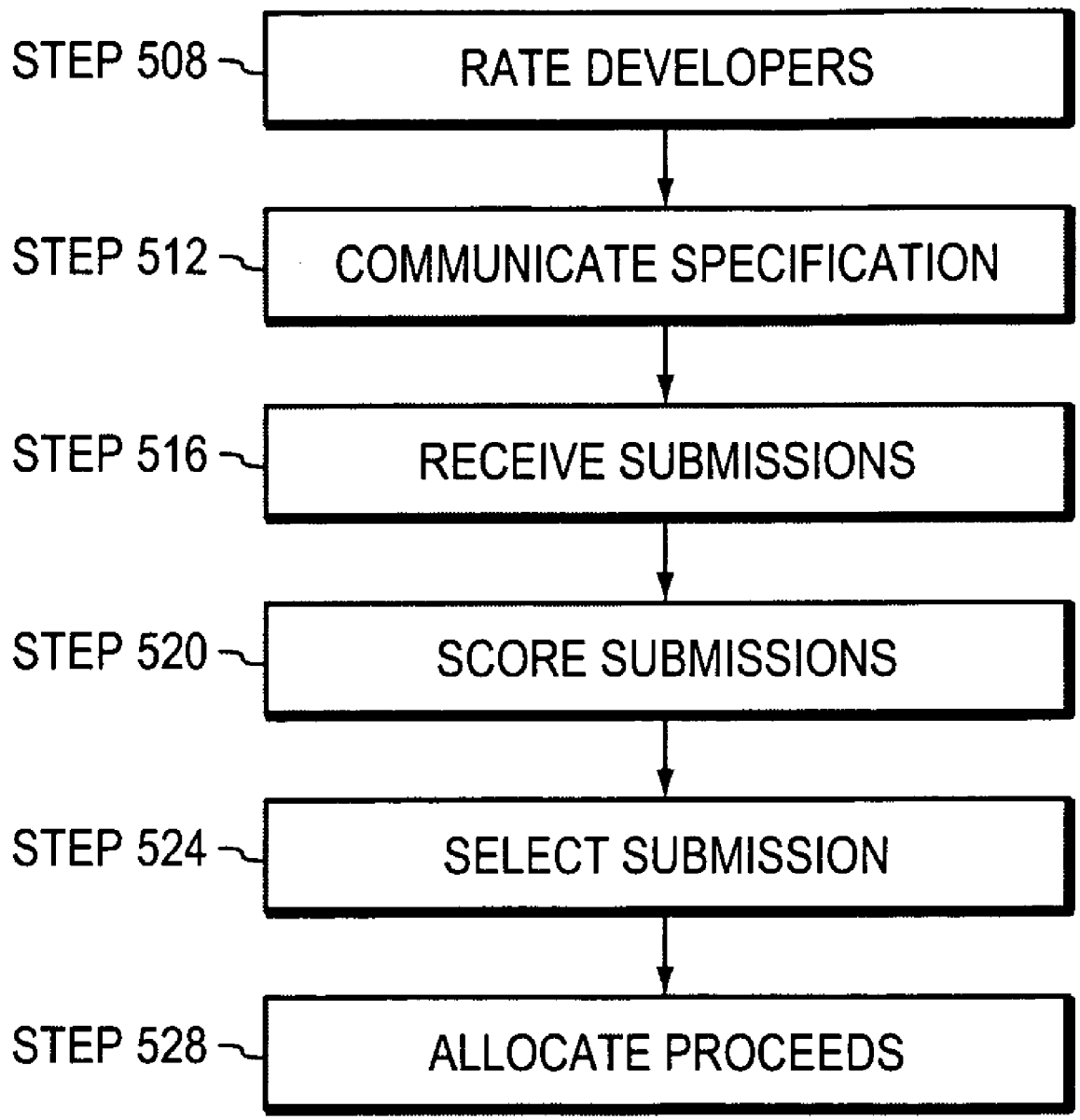
FIG. 5 is a flow chart of an embodiment of the steps performed by the members of the virtual software development team according to the invention.

Referring to FIG. 5, developers optionally are rated (STEP 508) according to their performance in coding competitions, their performance in designing, testing, or coding components, and possibly also other factors. The product manager 302 communicates the specification to developers (STEP 512). In some embodiments, the product manager 302 only communicates the specification to developers who have a rating, or who have a rating value above a predetermined minimum.

Developers create designs or components in response to the specification, and submit those designs or components for review to the product manager 302, primary architecture review board member 308, or primary development review board member 316 (STEP 516).

Each submission can then be scored, based on quality criteria, for example but not limited to, functionality, style, adherence to coding standards, performance, and stability (STEP 520). Once each submission is evaluated, and one submission is selected as the winning submission (STEP 524). The product manager 302 then allocates a portion of the proceeds to the developer who authored the winning submission using any of the methods described below (STEP 528).

Figure 6:
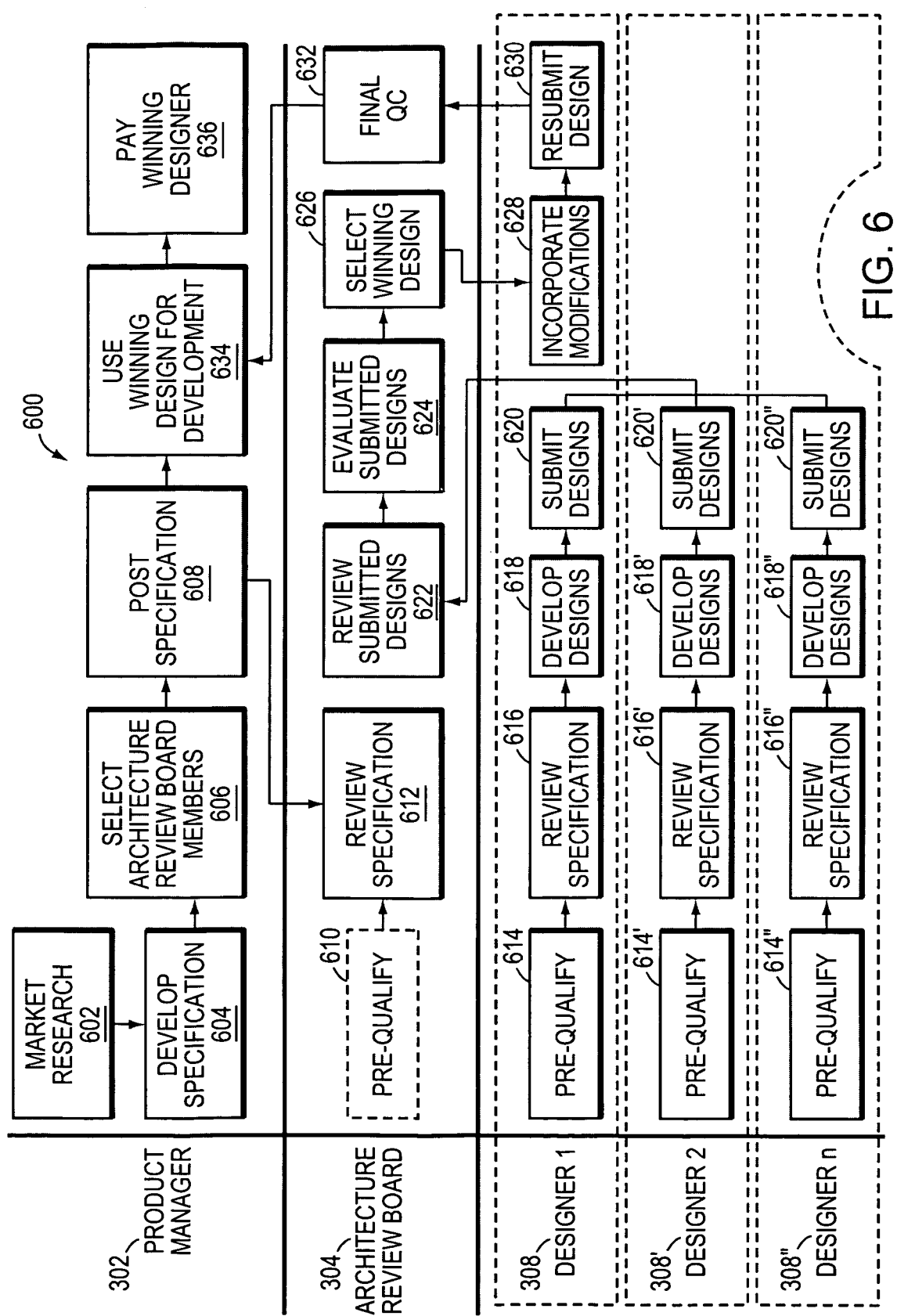
FIG. 6 is a more detailed flow chart of an embodiment of the steps of FIG. 5 performed by the virtual members of the software design team.

Referring to FIG. 6, in one specific embodiment, a product manager 302 conducts market research (STEP 602) to determine the need for a particular software component. Based on the results of the research, the product manager 302 specifies the design requirements of the software component (STEP 604).

The product manager 302 identifies (which can include selecting) the members of the architecture review board 304 (STEP 606) and provides the specification to the architecture review board 304 (STEP 608). In one embodiment, the product manager 302 places the specification on a web server for access by the architecture review board 304.

The architecture review board 304 can be already determined, as a standing architecture review board 304, or the architecture review board 304 members can be identified as members of the architecture review board 304 for this particular component. In one embodiment, the architecture review board 304 members are selected by the product manager 302 as a result of one or more of the their expertise, their ratings, and their expressed willingness to participate in this capacity. In one embodiment, the architecture review board 304 members are compensated for their participation in the review board 304.

In one embodiment, the architecture review board 304 is open to members of the general public. In another embodiment, the architecture review board 304 is limited to software designers who have participated in at least one design or coding competition and are optionally pre-qualified based on their competition performance (STEP 610). In another embodiment, only the excellent designers of one or more competitions are eligible for participation in the architecture review board 304.

For instance, a series of competitions can be used to identify excellent developers from a large number of contestants. Alternatively, an architecture review board 304 member can be required to periodically have a component selected in this process. Once the product manager 302 provides the architecture review board members access to the specification, the board members 304 review the specification to understand the design requirements (STEP 612). The board members 304 can ask for clarification or revision of the specifications, and the product manager 302 can respond. In this way, the review board members 304 make sure that they understand the requirements for the components that they will evaluate.

When the architecture review board 304 has reviewed the design requirements specification, the requirements are provided to designers. In some embodiments, prior to being granted access to the design specification, software designers 308, 308' and 308", generally 308, are pre-qualified (STEPS 614, 614' and 614") as described above based on ratings, skills, or other criteria. The product manager 302, or a member of the architecture review board 304 gives designers that meet pre-qualification requirements access to the specification. In some embodiments, access can be granted by a web page (which can require authentication for access), by email, or other technique. The designers 308 can review the specification (STEPS 616, 616' and 616") and develop designs (STEPS 618, 618' and 618"). When a designer 308 has completed his or her design, the designer 308 submits the design to the architecture review board 304 (STEPS 620, 620' and 620").

The designs can take a number of forms, depending on the component specified. Typically, the specifications for the component will include the requirements for the design. In one embodiment, the design includes class diagrams, which can be developed in the Unified Modeling Language (UML), for example using the Poseideon Computer Aided Software Engineering (CASE) tool, available from Gentleware AG of Hamburg, Germany. The design also includes use-case diagrams and sequence diagrams. The design also includes a written component design specification describing the design, a list of required algorithms, and class stubs for the classes in the design. The design also includes functional tests that can be used to test the program. In one such embodiment, the functional tests are tests compatible with the JUnit testing infrastructure. JUnit is open source software for testing Java software, which is available from www.sourceforge.net.

The architecture review board 304 reviews received designs (STEP 622). In one embodiment, this review includes a first screening review by a primary reviewer, and then further review by other members of the review board. The first screening review determines that the required elements of the design are included (e.g., class, use-case, and sequence diagrams, component specification, required algorithms, class stubs, and functional tests).

The screening review can also determine that these elements appear complete. With regard to the class diagram, for example, and in particular the class definition, the screening review can determine any or all of that: (1) the class definition provides a descriptive overview of the class usage, (2) sub-packages have been created to separate functionality, (3) class scope matches class usage, (4) there is proper and effective use of programming techniques such as inheritance and abstraction, (5) interfaces are used properly, (6) suitable constructors are defined for the component, and that (7) class modifiers such as final, static, are appropriately used. The screening review can also determine, for example, with regard to the variable definition, that: (1) variable scope is correctly defined, (2) type assignments are defined appropriately for balance between efficiency and flexibility, and (3) that all variables are defined with an initial value. Further, with regard to method definition, for example, the screening review can determine that: (1) scope is correctly defined, exceptions are handled and used appropriately, modifiers are properly used, return types are used, method arguments are properly defined, and that the application programming interface (API) as stated in the requirements specification is available.

The screening review can also, for example, verify that use-case diagrams exist for all public methods in the design, and that sequence diagrams exist for each use case. The screening review can also, for example, with regard to test cases, verify that functional test cases are provided for each sequence diagram, and that they appear to be appropriate for those diagrams.

In one embodiment the initial screen reduces the number of entries to a manageable number for the review board to review, such as 5 entries.

The architecture review board evaluates the designs to determine whether they comply with the specifications (STEP 624). In embodiments in which there is an initial screening, the members of the review board each perform a review to evaluate the submission.

In some embodiments, the architecture review board 304 calculates a score for the submission, based for example on the quality of the design and how well it complies with requirements stated in the specification. For example, a review board member will determine whether and to what degree: (1) the design addresses the requirements detailed in the functional specification, (2) the design effectively uses all required technologies (e.g., language, required components, etc.), (3) the design incorporates standard design patterns and methodologies where applicable, (4) the design balances the use of design patterns and principles with the expected component usage, (5) the design accounts for incorporating additional functionality and features beyond the initial intended usage.

In some embodiments, each architecture review board member also closely evaluates the degree to which the design elements. For example, with regard to the class diagram, and in particular, for example, the class definition, the architecture review board member evaluates whether the class diagram accurately and thoroughly depicts the required elements of the component. The board member also evaluates whether the design is suitable given the expected component usage and throughput requirements. With regard to variable definition, the board member evaluates whether variable types are suitable for the expected component usage, and confirms that the variables used meet the minimum and maximum value parameters. With regard to method definition, the board member evaluates the degree to which (1) the defined methods properly expose the API requirements defined in the requirements specification, (2) the methods provide access to and properly encapsulate the defined variables, and (3) the exceptions defined is an inclusive list of the anticipated exceptions. The board member can also evaluate whether (1) class relationships are well defined, (2) the use-case diagram thoroughly depicts class usage, (3) the sequence diagram thoroughly depicts the ordered interaction between classes, (4) the component specification provides sufficient information for this design to be implemented, details how invalid arguments should be handled for the defined methods, and details the exceptions thrown by the defined methods, and (5) that the test cases thoroughly and accurately address component functionality. The board member can then assign an overall score to each entry.

For example, the architecture review board 304 members can use the server 104 of FIG. 1 to record and communicate their evaluations of the component designs to the other board members. In one embodiment, the board member uses an on-line evaluation form to evaluate each component. The evaluations of the board members can then be identified, and the components ranked by board member scores received.

In one embodiment, the architecture review board 304 members can also use the server 104 of FIG. 1 to subject the design to one or more tests that target individual requirements as defined in the specification. Using the results of these targeted tests, members of the architecture review board 304 (e.g., using the server 104) can obtain a design score for each submission. Based on the evaluation of the submission(s) the architecture review board 304 selects a design as the winning submission (STEP 626).

In some cases, modifications may need to be made to a design, even a design that is the high scorer, based on additional ideas or problems identified by the reviewers. In one embodiment, the architecture review board 304 sends the design back to the designer 308 who submitted the winning design, along with suggestions for modifications, explicit directions to make certain modifications, or other instructions, and so on. In some embodiments, the primary architecture review board member makes the modifications. The designer 308 incorporates the changes into the design (STEP 628) and resubmits the design to the architecture review board 304 (STEP 630). The architecture review board 304 then performs a final quality control review of the design (STEP 632), and sends the design to the product manager 302. The product manager 302 can then use the design to solicit developed software components based on the winning design (STEP 634), for example as further illustrated with reference to FIG. 7. The product manager 302 can also pay the winning designer 308, either a flat fee, or using methods described below.

Figure 7:
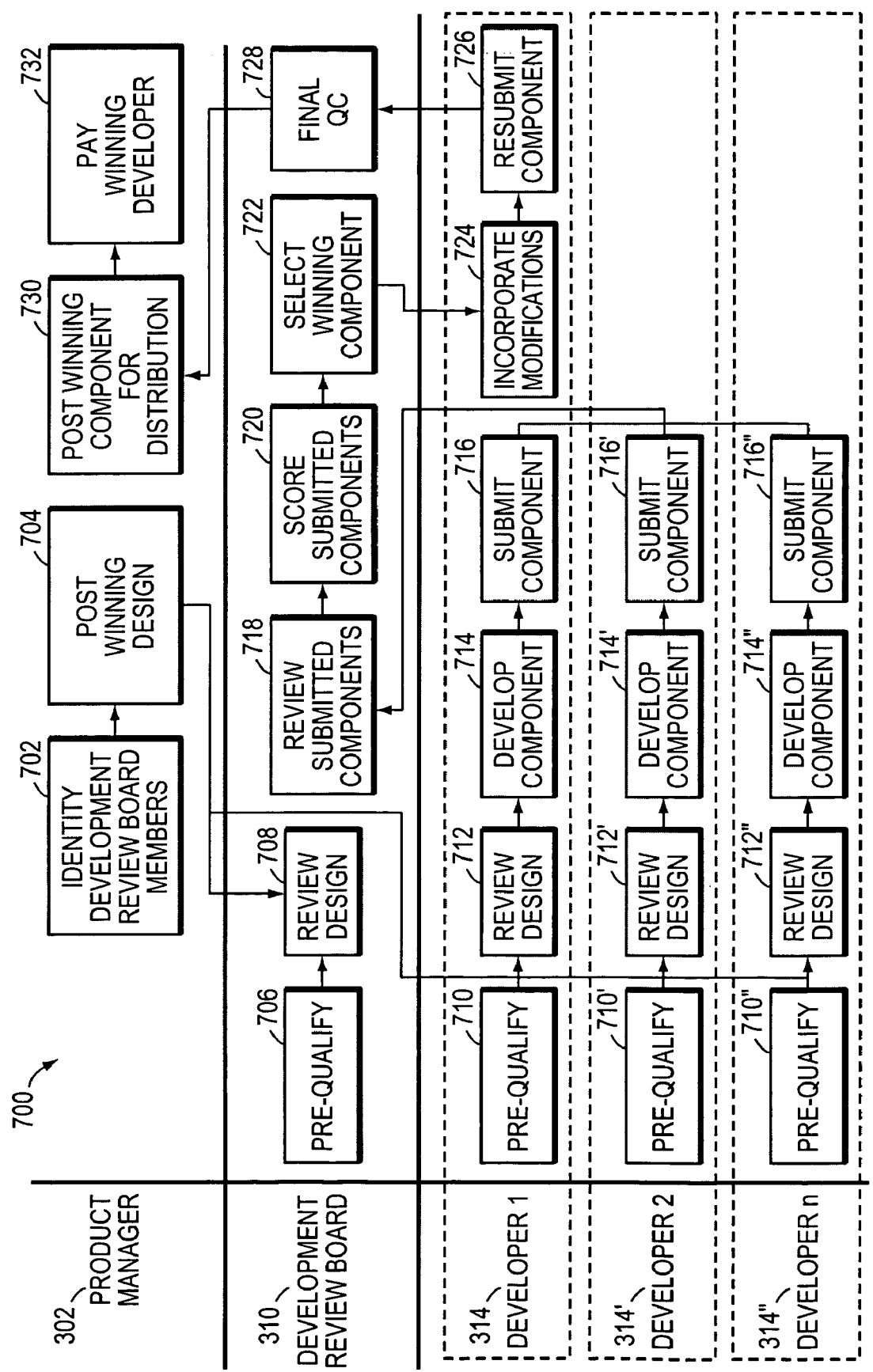
FIG. 7 is a more detailed flow chart of an embodiment of the steps of FIG. 5 performed by the virtual members of the software programming team.

Referring to FIG. 7, once a software design is available, for example by using the method of FIG. 6 or otherwise, the design can be used to facilitate the development of a software component.

The product manager 302 identifies the members of a development review board 310 (STEP 702). This could, optionally, include prior or concurrent selection of a development review board for the component. The product manager 302 provides the design to the development review board 310 (STEP 704). In one embodiment, the product manager 302 places the design on a web server for access by the development review board.

The development review board 310 can already be determined, as a standing development review board 310, or the development review board 310 members can be identified as members of the development review board for a particular component or group of components. In one embodiment, the development review board 10 members are selected by the product manager 302 as a result of their expertise, their ratings, and their expressed willingness to participate in this capacity. In one embodiment, the development review board members are selected after the software components are submitted to allow all developers an opportunity to submit components. In one embodiment, the development review board 310 members are compensated for their participation in the review board 310. This compensation can be in the form of recognition, a flat or hourly fee, or a percentage of revenue generated by the component.

In one embodiment, the development review board 310 is open to members of the general public. In another embodiment, the development review board 310 is limited to software developers who have participated in at least one design or coding competition and are optionally pre-qualified based on their competition performance (STEP 710). In another embodiment, only the excellent developers of one or more competitions are eligible for participation in the development review board 310.

For instance, a series of competitions can be used to identify excellent developers from a large number of contestants. Alternatively, a development review board 310 member can be required to have recently submitted one or more winning component(s) or designs. Once the product manager 302 grants the development review board 310 access to the specification, the board members review the specification to understand the development requirements, as described above (STEP 708). The development review board members 310 can ask for clarification or revision of the specifications, and the product manager 302 can respond. In this way, the development review board 310 can be sure to understand the requirements for the components that they will evaluate.

In some embodiments, prior to being granted access to the design, the software developers (also called programmers) 314, 314' and 314", generally 314, are also pre-qualified (STEPS 710, 710' and 710"), which may be similar to that described above for the board members (e.g., ratings, etc.) or otherwise. The product manager 302, or a member of the development review board 310 then grants those developers that meet the pre-qualification requirements access to the design. In some embodiments, access can be granted by a developer 314 entering a password, by a developer 314 navigating to a particular web page which checks the developer's qualifications, by the product manager 302 emailing the specification to the developers 314, or other similar means. Once granted access to the specification, the developers 314 can then review the specification (STEPS 712, 712' and 712") and begin developing software components consistent with the posted design (STEPS 714, 714' and 714"). Once a developer 314 has completed developing their software component, the developer 314 submits the component to the development review board 310 (STEPS 716, 716' and 716").

In some embodiments, the components are subjected to a peer review process. The peer review process allows developers to test and review the components developed by other developers. For example, developer 314 may create a software component and, prior to submission, developer 314' may subject the component to one or more tests to determine the quality of the component. As described above, the developers 314, 314' and 314" typically have minimal or no prior relationship to each other. In one exemplary embodiment, the developers on-line nicknames are used instead of the their actual identities. Because the components are subjected to this independent and anonymous peer review process, the quality of the submitted components will be very good.

The submitted components can take a number of forms depending on the component specified. Typically, the specifications for the component will include the requirements for the developed component. In one embodiment, the developed component includes source code, which can be written in the Java programming language, for example, using the Java 2 Micro Edition (J2ME) development platform from Sun Microsystems of Santa Clara, Calif. The component also includes unit test cases and log documenting successful execution against the test cases. The component also includes documentation. In one such embodiment, the documentation is consistent with Javadoc style documentation. The component also includes a deployment guide.

The development review board 310 reviews received components (STEP 718). In one embodiment, this review includes a first screening review by a primary reviewer, and then further review by other members of the development review board 310. The first screening review determines that the required elements of the design are included and are functional (e.g., source code, unit test cases, documentation, log files, and deployment guide).

The screening review can also determine that these elements appear complete. With regard to the source code, for example, the screening review can determine any or all of that: (1) all public methods are clearly commented; (2) required tags such as "@author," "@param," "@return," "@throws," and "@version" are included; (3) the copyright tag is populated; (4) the source code follows standard coding conventions for the Java language such as those published by Sun Microsystems; (5) a 4 space indentation is used in lieu of a tab indentation; and (6) all class, method and variable definitions found in the class diagram are accurately represented in the source code. The development screening review can also, for example, verify that unit test cases exist for all public methods in the design, and each unit test is properly identified by a testing program.

In one embodiment, the initial development screening process reduces the number of entries to a manageable number for the development review board 310 to review, such as five entries.

The development review board 310 evaluates the components to determine whether they comply with the design (STEP 720). In embodiments where there is an initial screening, the members of the review board each perform a review to evaluate the submitted component.

The development reviewer evaluates the component code against the design. In one embodiment, for example, with regard to the component, the reviewer evaluates the extent to which: (1) the implementation addresses the functionality as detailed in component design documents; (2) the implementation correctly uses all required technologies (e.g. language, required components, etc.) and packages; (3) the implementation properly implements required algorithms; (4) the implementation has correctly implemented (and not modified) the public application programming interface (API) as defined in the design, with no additional public classes, methods, or variables.

With regard to class definitions, for example, the reviewer evaluates the extent to which classes are implemented as defined in the design documents (including, for example, modifiers, types, and naming conventions), and whether defined classes are implemented. With regard to variable definitions and method definitions, for example, the reviewer evaluates the extent to which all variables and methods are implemented as defined in the design documents (including, for example, modifiers, types, and naming conventions). With regard to relationships, for example, the reviewer evaluates the extent to which the implementation properly maps class relationships.

The reviewer can further evaluate the code by performing a code inspection. For example, the reviewer can determine the extent to which the object types defined in the implementation are the best choices for the intended usage—for example whether a Vector type should have been used instead of an Array type. The reviewer can determine the extent to which there are any needless loops, or careless object instantiation or variable assignment. With regard to test cases, for example, the reviewer can determine the extent to which (1) the unit test cases thoroughly test all methods and constructors; (2) the unit test cases properly make use of setup and teardown methods to configure the test environment; (3) files used in unit test cases exist in the designated directory; (4) unit test cases do not leave temporary files on the file system after testing is complete.

The reviewer can even further evaluate the code by conducting accuracy, failure, and stress tests. Accuracy tests test the accuracy of the results output when provided valid input. Accuracy tests can also validate configuration data. Failure tests test for correct failure behavior when the component is provided with invalid input, such as bad data and incorrect usage. Stress tests test the component capacity for high-volume operation, but testing such characteristics as performance as throughput. The tests that fail are included in the evaluation of the component, for example as a score reduction. Each reviewer can then assign an overall score to the component based on this evaluation.

In one embodiment, the development review board members 310 can use the server 104 of FIG. 1 to subject the design to one or more tests that target individual requirements, for example as set out in the design. Using the results of these targeted tests, members of the development review board (e.g., using the server 104) can obtain a total score for each submission.

For example, the development review board members 310 can use the server 104 of FIG. 1 to record and communicate their evaluations of the component designs to the other board members. In one embodiment, the board member uses an on-line evaluation form to evaluate each component. The evaluations of the board members can then be identified, and the components automatically ranked by board member scores received. Based on the evaluation of the submission(s) the development review board 310 selects a design as the winning submission (STEP 722).

In some cases, modifications may need to be made to the winning component. In these cases, the development review board 310 sends the component back to the developer 314 who submitted the winning component, along with suggestions for modifications, explicit directions to make certain modifications, or other instructions and so on. The developer 314 incorporates some or all of the changes into the component (STEP 724) and resubmits the component to the development review board 310 (STEP 726). The development review board 310 can then perform a final quality control review of the component (STEP 728), and sends the component to the product manager 302. The product manager 302 can then include the component in a component catalog, as described below, and make the component available for distribution (STEP 730). The product manager 302 can also pay the winning developer 314, using any one of the methods described below (STEP 732).

Figure 8:
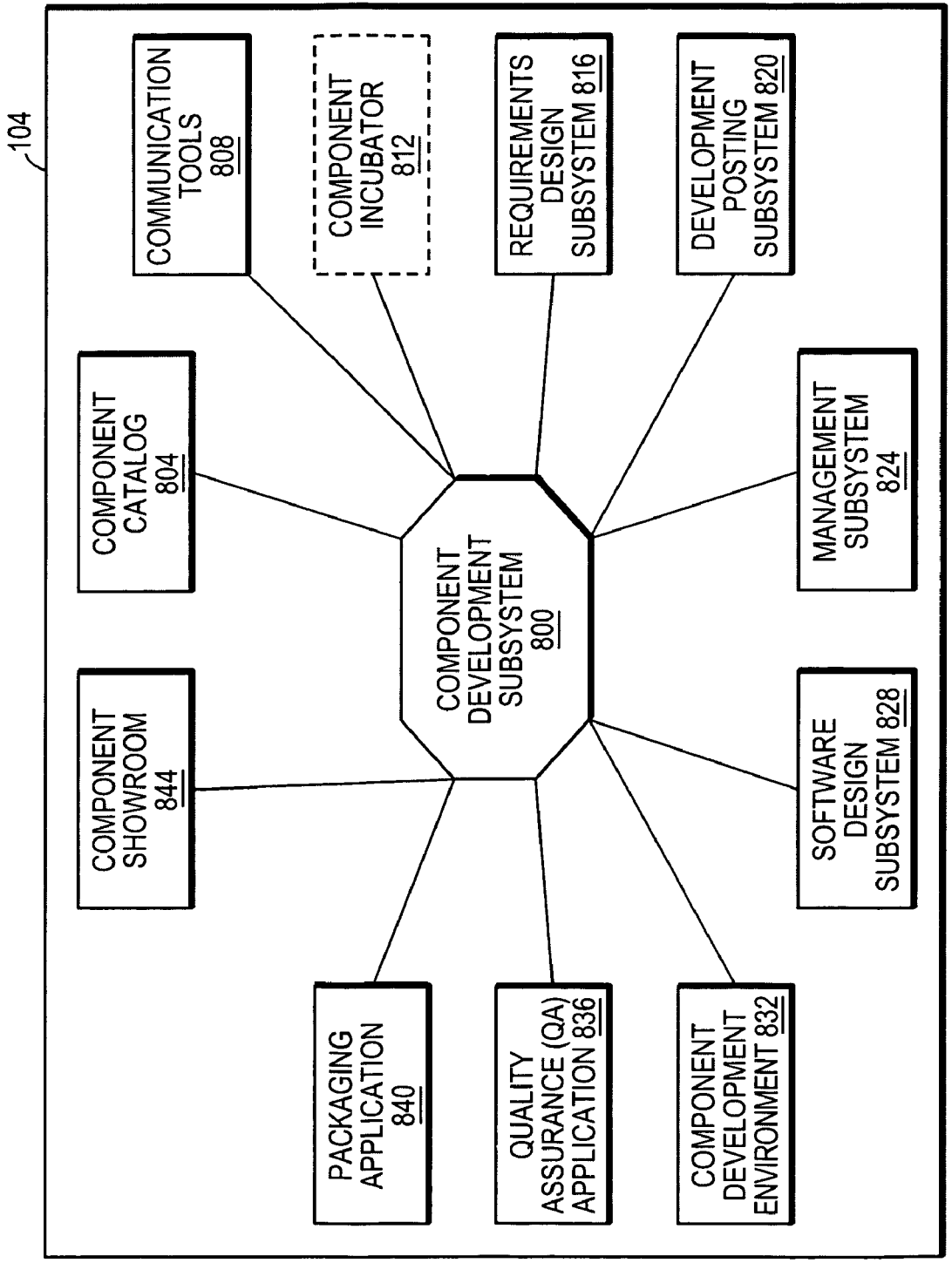
FIG. 8 is a more detailed block diagram of an embodiment of the server of FIG. 1 to facilitate the development and/or distinction of software programs according to the invention.

Referring to FIG. 8, the server 104 can include a number of modules to facilitate the development and/or distinction of components. For example, a component development subsystem 800 can facilitate the development process described above. The component development subsystem 800 facilitates the development of a component with the development team 200 and communicates with many different modules to achieve the distributed team development process.

In one embodiment and as described in more detail below, the server 104 can include a component catalog 804. The component catalog 804 stores components developed by the development team 200. In one embodiment, the component catalog 804 provides a catalog or directory of information about components available to potential purchasers. For instance, a customer of the server 104 can view a directory of the component catalog 804 and information about each component in the component catalog 804 before selecting a particular component. Once the server 104 (or administrator of the component catalog 804) receives the required fee payment or authorization information for the component, the server 104 downloads the component to the client 108 over the communications network 112. The component catalog is described further with reference to FIG. 10 below.

The server 104 also includes communication tools 808. In one embodiment, the communication tools 808 are tools that facilitate communication between the team members 204, 208, 212, 216 of the development team 200. Examples of the communication tools 808 include, but are not limited to, a module enabling the real-time communication between team members 204, 208, 212, 216 (e.g., chat), news groups, on-line meetings, and document collaboration tools.

Moreover, the server 104 can also include a component incubator 812. The component incubator 812 is a module enabling users to submit suggestions for components or modifications to components which can then be used as the basis for market research.

The server 104 can include a requirements design subsystem 816. The requirements design subsystem 816 enables the product manager 204 and architect 208 to view and comment on the requirements specification. In further embodiments, the requirements design subsystem 816 enables the product manager 204 and the architect 208 to create, edit, download, upload, and/or approve requirements in the specification (e.g., over the communications network 112). In one embodiment, the requirements design system can share and manipulate models in UML.

The server 104 additionally includes a development posting subsystem 820. The development posting subsystem 820 enables the server 104 or product manager 204 to communicate with potential development team members to promote development projects and grow a community of contributors that contribute to the component catalog. In one embodiment, the development posting subsystem 820 displays an advertisement to potential development team members. In one embodiment, the advertisement describes the project using text, graphics, video, and/or sounds. The advertisement may also describe positions available in the development team 200. Examples of communication techniques include, without limitation, posting these ads on the server's web site, displaying statistics about the project (e.g., planned royalties paid to development team members, development team members who are participating in this project, development hours available per week). Moreover, in one embodiment the development posting subsystem 820 accepts inquiries associated with development projects. In further embodiments, the development posting subsystem 820 suggests members of the competition member base to form a development team to handle an inquiry. The development posting subsystem 820 may analyze, for example, the rating of each member of the coding competition member base, previous contributions to previous development projects, the quality of contributions to previous component development projects (e.g., based on a score given to each development team member 204, 208, 212, 216 at the completion of the component, as discussed above), and current availability of the potential team member when recommending a member of the competition member base to be part of the development team 200. The product manager 204 may or may not be an advertised position as just described.

The server 104 also includes a management subsystem 824. The management subsystem 824 is a module that allocates revenue to a development team member (e.g., developer 212, QA developer 216). In one embodiment, a development team member earns an ongoing royalty on component licenses or sales of copies of the component. In further embodiments, the management subsystem 824 enables the product manager 204 and architect 208 to view inquiries for projects and select project teams based on a recommendation from the server 104 (i.e., the development posting subsystem 820). The management subsystem 824 can also track deliverables produced by the development team 200 (e.g., source code, documentation, and schema) and/or enable the review of development team members 204, 208, 212, 216 after the development of the component. The management subsystem 824 can also scan development team member information, such as, but not limited to, history, coding competition ranking, and prior work experience. In some embodiments, the management subsystem 824 can display the development team member information to the product manager 204 and/or architect 208 via, for instance, a graphical user interface.

The server 104 also includes a software design subsystem 828. The software design subsystem 828 enables collaboration between the team members 204, 208, 212, 216. More specifically and in one embodiment, the software design subsystem 828 enables team members 204, 208, 212, 216 to view and/or comment on the design documents, such as object diagrams (e.g., class diagrams and use-case diagrams, and so on.). In another embodiment, the software design subsystem 828 enables development team members 204, 208, 212, 216 to create, download, upload, and/or edit the design documents and/or the architecture documents over the communications network 112.

Moreover, the server also includes a component development environment (CDE) 832. The CDE 832 enables team members 204, 208, 212, 216 and potential purchasers of the components to create applications by linking components together. In one embodiment, the CDE 832 is a web-based application (e.g., applet or plug-in application). In additional embodiments, the CDE 832 is included in the client software 120. The CDE 832 also enables the transition of a component from a QA application which tests the component, as described below, into the integration module, also described below, to create larger components or applications. The CDE 832 also enables the migration of standalone components from QA to production and/or the migration of an application or larger component to production. The CDE 832 may additionally incorporate commercially available Integrated Development Environment (IDE) software.

The server 104 additionally includes a quality assurance (QA) application 836. The QA application 836 enables the testing of all applications and/or components. In one embodiment, the QA application 836 executes test cases developed by the QA developer 216. Moreover, the QA application 836 may execute an automated test on the component or application, such as to verify and/or measure memory usage, thread usage, machine statistics such as I/O usage and processor load. Additionally, the QA application 836 can score the component by performance, design, and/or functionality. Moreover, the QA application 836 can be a test harness for testing multiple components simultaneously.

In one embodiment, the server 104 can include a packaging application 840. The packaging application 840 packages deliverables (e.g., source files, executables, documentation, and/or supporting material (e.g., XML, DDL)) in a downloadable file (e.g., .ZIP file, Java Archive (.JAR file), or dynamic link library (.DLL) file). In one embodiment, the packaging application 840 packages these deliverables into a downloadable file when a customer purchases a component from the component catalog. The packaging application 840 then downloads the file to the client 108.

The server 104 also includes a component showroom 844. The component showroom 844 promotes the license (and/or sales of copies) and usage of the components by providing information about the component. The component showroom 844 can also provide the ability to, for instance but not limited to, demonstrate component usage, demonstrate a case study, provide a list of related components and applications, and provide information about pricing and/or licensing.

Although described above as independent subsystems and modules, this is for exemplary purposes only and these subsystems and modules may alternatively be combined into one or more modules or subsystems. For example, in another embodiment, the component development module 800 can perform any number of the functions described above. Moreover, one or more of the subsystems described above may be remotely located from other modules (e.g., executing on another server 104 in a server farm).

Figure 9:
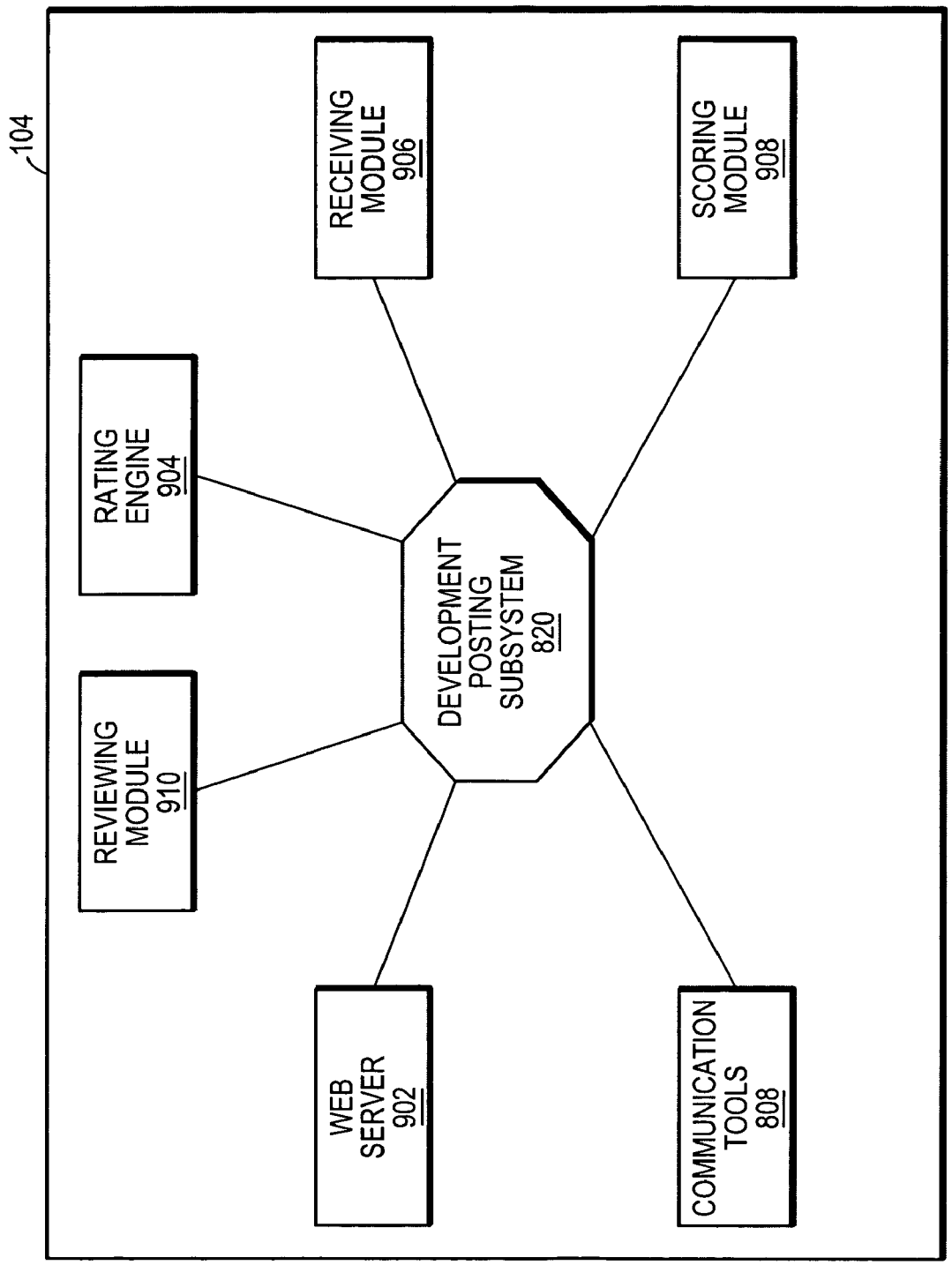
FIG. 9 is a more detailed block diagram of an embodiment of the server if FIG. 1 to facilitate the posting of specifications and the receipt and scoring of submissions according to the invention.

Referring to FIG. 9, the development posting subsystem 820 includes a web server 902. The product manager 204 can use the web server 902 to post design or specifications for distribution to the software team 200. The server 104 also includes a rating engine 904. In one embodiment, the rating engine 904 calculates ratings for each participant in one or more coding competitions. In other embodiments, the rating engine can calculate ratings for members of project teams 200 based on the individual members' contributions to the project. The server 104 also includes a receiving module 906. In one embodiment, the receiving module 906 receives computer software designs submitted to the development posting subsystem 820 by members of the project team 200. Alternatively, the receiving module 906 facilitates the receipt of submissions from developers 212 competing for spots on the development team 200. The server 104 also includes a scoring module 908. In one embodiment, the architecture review board 304 uses the scoring module 908 to evaluate multiple software designs submitted by the software designers 308. Additionally, the development review board 310 can use the scoring module 908 to evaluate multiple software components submitted by the programmers 314. The server also includes a reviewing module 910. Additionally, developers can use the reviewing module 910 to review submissions from other developers. In one embodiment, the web server 902, rating engine 904, receiving module 906, scoring module 908, and reviewing module reside on the server 104. Alternatively, the web server 902, rating engine 904, receiving module 906, scoring module 908, and reviewing module 910 can reside on other servers or remote devices.

Figure 10:
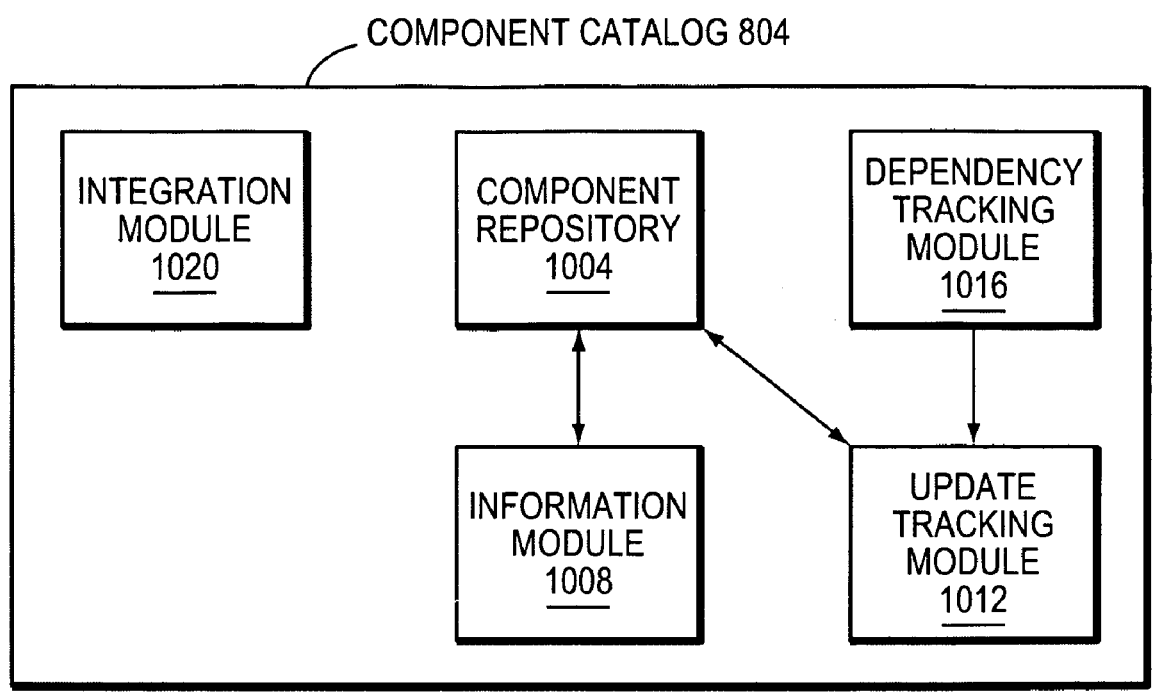
FIG. 10 is a block diagram of an embodiment of a software catalog according to the invention.

Referring to FIG. 10, the component catalog 804 includes a component repository 1004. The component repository 1004 is a central store for components that the server 104 can publicize and sell to purchasers. In one embodiment, the component catalog 804 is stored on the server 104. Alternatively, the component catalog 804 can be stored on another server or remote storage device (e.g., database server). In some embodiments, the component repository 1004 provides the user interface to potential purchasers wishing to purchase a component or its information. Typically, the user interface generates code for the client software 120 or web browser 116 used by purchasers to communicate with the server 104.

The component catalog 804 additionally includes an information module 1008. The information module 1008 provides information about the components to the component repository 1004. For instance, the information module 1008 can provide or include a table listing supported components of the server 104 that are stored in the component repository 1004. Moreover, the information module 1008 can also provide documentation for each component to the component repository 1004, such as, but not limited to, the component's memory requirements, efficiency, score received in QA testing, and members of the development team 200. In one embodiment, the information module 1008 is in communication with the component repository 1004 to provide the component information to the component repository 1004 so that, for example, a potential purchaser can view a component's information (e.g., performance) during selection.

The component catalog 804 also includes an update tracking module 1012. The update tracking module 1012 ensures that the component repository contains the most recent version of a component. In one embodiment, upon the determination of a modification to a component previously purchased by a customer, the component catalog 804 receives the change. The update tracking module 1012 ensures that the modified component is stored in the component repository 1004. In some embodiments, the update tracking module 1012 alerts the product manager 204 or architect 208 of the modification. In yet other embodiments, the update tracking module 1012 transmits only the modified portion of the component to the component repository 1004 for more efficient updates. In further embodiments, if a component is modified, the update tracking module 1012 transmits a message to all customers who had previously purchased the previous version of the component to notify the customers that a newer version is available and the differences between this version and the previous version.

The component catalog 804 additionally includes a dependency tracking module 1016. The dependency tracking module 1016 tracks the dependencies between components that are linked together in an application. For example, a component purchaser purchases a component A from the server 104. Component A is a larger component made up of components B, C, and D. If component C is subsequently modified, in one embodiment the server 104 notifies the purchaser that component C has been modified and component C depends off of component A. The purchaser, however, is interested in component A. If the purchaser only updates component C, then the purchaser's component A may not operate unless the purchaser downloads the updated component B and D. The dependency tracking module 1016 is the module that tracks such dependencies. In some embodiments, the dependency tracking module 1016 notifies customers about dependencies.

The component catalog 804 also includes an integration module 1020. In one embodiment, the integration module 1020 integrates components in the component catalog 804 to form larger components or applications. For instance, the product manager 204 can determine that a need exists for a particular component A. If the product manager 204 realizes that no component A exists in the component catalog 204 but does realize that other components exist that may be able to create component A using other components, the product manager 204 can plan a project for the creation of the component A. In one embodiment, the integration module 1020 facilitates the integration of many components into one larger component.

Figure 11:
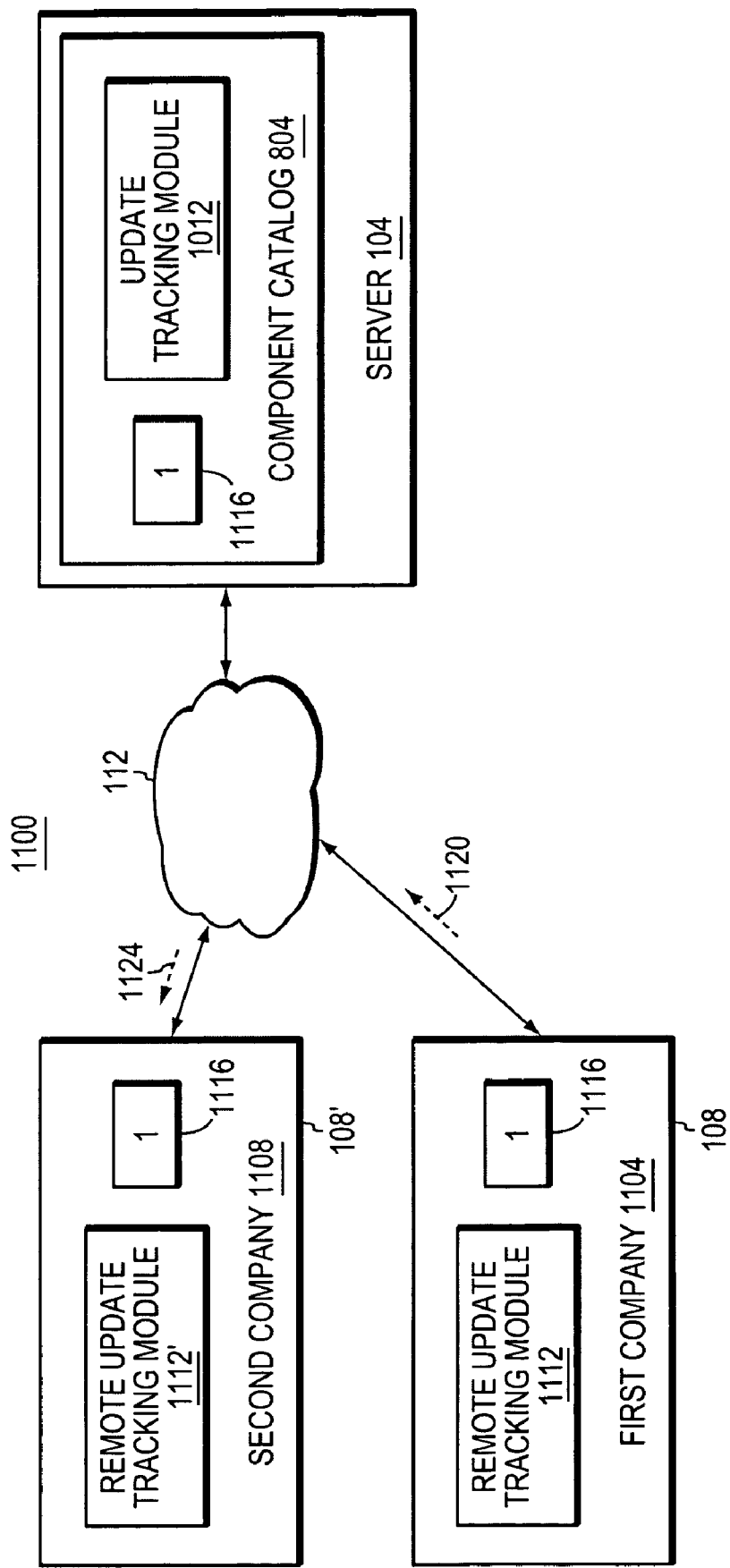
FIG. 11 is a block diagram of an embodiment of a software catalog system communicating with a first company and a second company according to the invention.

For example and referring to FIG. 11, a component catalog system 1100 includes a first company 1104 operating the first client 108 and a second company 1108 operating the second client 108'. The companies 1104, 1108 communicate with the server 104 over the communications network 112. The server 104 includes the component catalog 804 and the component catalog 804 includes the update tracking module 1012. Although not illustrated, each client 108, 108' includes the respective web browser 116, 116', the server 104 includes the modules (e.g., component showroom 844) described above in FIG. 8, and the component catalog 804 includes the modules (e.g., the information module 1008) described above in FIG. 10.

In one embodiment, the server 104 transmits a remote upload tracking module 1112, 1112', generally 1112, to the first and second companies 1104, 1108, respectively. Each remote upload tracking module 1112 communicates with the upload tracking module 1012 when a company 1104, 1108 modifies a component that is stored in the component catalog 804. Additionally, the remote upload tracking module 1112 also enables a company (e.g., 1104, 1108) to add their components to the component catalog 804, thereby making the component available to other companies. In some embodiments, the remote upload tracking module 1112 may be implemented in various forms, for example, it may be in the form of a Java applet that is downloaded to the client 108 and runs in conjunction with the web browser 116 and/or client software 120, or the remote upload tracking module 1112 may be in the form of a standalone application, implemented in a multi-platform language such as Java or in native processor executable code. Further, the remote upload tracking module 1112 may be implemented as the client software 120.

In one embodiment, the first company 1104 produces a first version of a component 1116. In one embodiment, the remote upload tracking module 1112 then automatically transmits the component 1116 to the server 104 (e.g., the upload tracking module 1012) over the communications network 112 for addition into the component catalog 804. Alternatively, the remote upload tracking module 1112 queries the first company 1108 (e.g., an employee of the first company 1104) if the first company 1108 wants to submit the component to the component catalog 804 and consequently make the component available to other companies (e.g., the second company 1108). For instance, the remote upload tracking module 1112 queries the first company 1104 via a dialog box (e.g., displayed on the web browser 116 or client software 120). If the first company 1104 agrees to the query (e.g., selects YES from a dialog of adding the component 1116 to the component catalog 804), the remote update tracking module 1112 transmits the component 1116 to the server 104, as illustrated with arrow 1120. In one embodiment, the remote upload tracking module 1112 has an option (e.g., checkbox) to transmit completed components to the server 104. Once the option is selected, the remote upload tracking module 1112 does not query the first company 1104 but rather automatically transmits the completed component to the server 104 and does so until the option is unselected. Additionally, although tailored towards the first company 1104, the description also applies to the second company 1108. In another embodiment, other functions, such as royalty negotiation, effort determination, and so on, may take place before a third party component is added to the component catalog 804.

In one embodiment, the uploaded components undergo a QA process as described herein before addition to the component catalog 804. In one embodiment, upon receiving the first version of the component 1116, the server 104 subjects the component 1116 to one or more of the steps described above in FIG. 4. For example, the server 104 does not add the component 1116 into the component catalog 804 without performing the QA testing on the component (STEP 428). In additional embodiments, the server 104 does not add the component 1116 to the component catalog 804 until the architect 208 provides the final approval to the product manager 204. Thus, if version 1 of the component 1116 does not meet the stringent coding standard requirements of the architect 208 (and/or product manager 204), the component 1116 is not added to the component catalog 408. In further embodiments, the server 104 notifies the first company 1104 that the component 1116 did not meet the required standards for entry into the component catalog 804. The server 104 can additionally provide the first company 1104 with the problems found in the component 1116.

If the component 1116 does meet the server's requirements and is consequently added to the component catalog 804, the server 104 can then display the component 1116 in the component catalog 804 for potential purchase. Thus, if a second company 1108 views the component catalog 804 (e.g., via the component showroom 844), the second company 1108 can purchase version 1 of the component 1116. After the sale, the server 104 subsequently transmits the component 1116 to the second company 1108, illustrated with arrow 1124. In one embodiment, the first company 1104 may be compensated for any sale of version 1 of the component.

Figure 12:
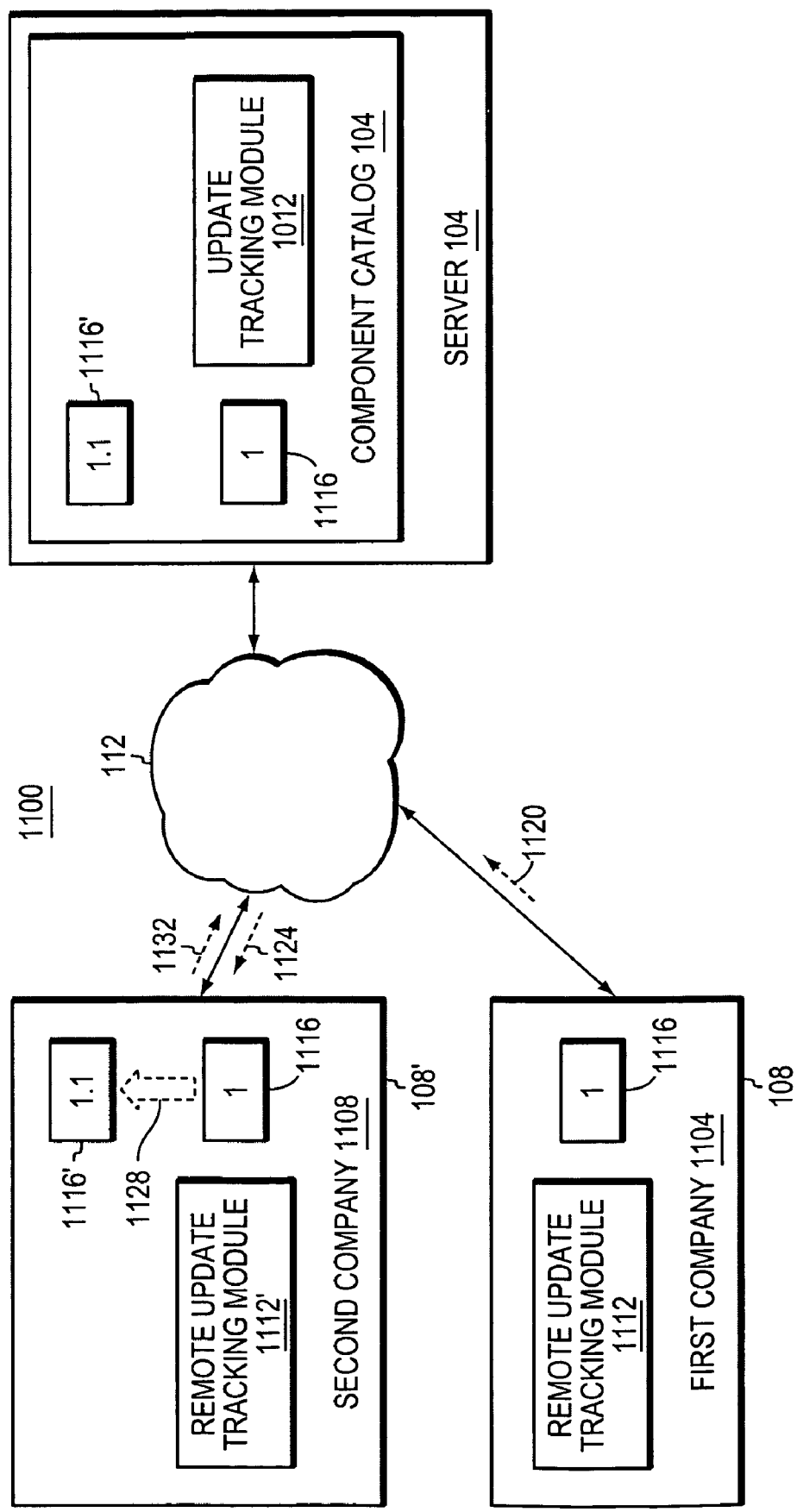
FIG. 12 is a block diagram of an embodiment of a software catalog system illustrating modification of a software component according to the invention.

Referring to FIG. 12, in one embodiment the second company 1108 purchases version 1 of the component and subsequently modifies the component 1116, shown with modification arrow 1128. A modification is, for example, an improvement (e.g., efficiency increase, smaller memory requirements), deletion (e.g., of an unneeded step or feature), and an addition (e.g., of a complimentary feature or function) to the component 1116. Another example of a modification is the integration of the component 1116 into another component (e.g., a larger component). In response to the modification, version 1 of the component 1116 becomes, for example, version 1.1 of the component 1116'. In one embodiment, the remote update tracking module 1112 transmits a message to the server 104 stating that the second company 1108 has modified the component 1116. In further embodiments, the remote update tracking module 1112 then transmits (or, e.g., queries and transmits) the modified version 1.1 to the server 104, as shown with arrow 1132. Upon receipt of version 1.1 of the component 1116', the server 104 and/or development team members determine whether the modified component 1116' can be added to the component catalog 804 by performing the steps illustrated in FIG. 4. In one embodiment, when version 1.1 of the component 1116' is added to the component catalog 804, version 1.1 replaces version 1 of the component 1116. Alternatively, version 1.1 of the component 1116' is added as another component in the component catalog 804. The replacement or addition of version 1.1 of the component 1116' may depend on the amount of changes relative to version 1 of the component. Furthermore, the update tracking module 1012 may notify each customer who previously purchased version 1 of the component 1116 that an updated version 1.1 has been added to the component catalog 804. The other modules 1008, 1016, 1020 may also notify customers about, for example, additional dependencies and available information. Additionally, in some embodiments the second company 1108 is compensated for licenses/sales of copies of the second version of the component 1116'.

In one embodiment, members of a development team (e.g. 208, 212, 216) working on a software product (e.g. a component or a software application) are paid a fee for their work on the product. Although preferably a software component, the product that is developed by the distributed software development system 101 can be any software application or type of intellectual property. In one embodiment and as described above with respect to FIG. 8, the development posting subsystem 820 of the server 104 posts project listings and descriptions of the projects in the project listings, such as in an advertisement. The advertisement or posting can include, for instance, the contribution of each development team member, the fee that a development team member receives for work on the project, and the total contribution of the entire development team.

In one embodiment, the members of a development team receive a royalty based on their contribution to the product and the revenue earned from licenses or sales of copies of the product. The management subsystem 824 (also described above with respect to FIG. 8) of the server 104 tracks particular characteristics for determining the royalty amounts to be paid to the members of the development team. In one such embodiment, the fee is an advance payment on royalties, meaning that royalties are not paid until the advance is covered.

Figure 13:
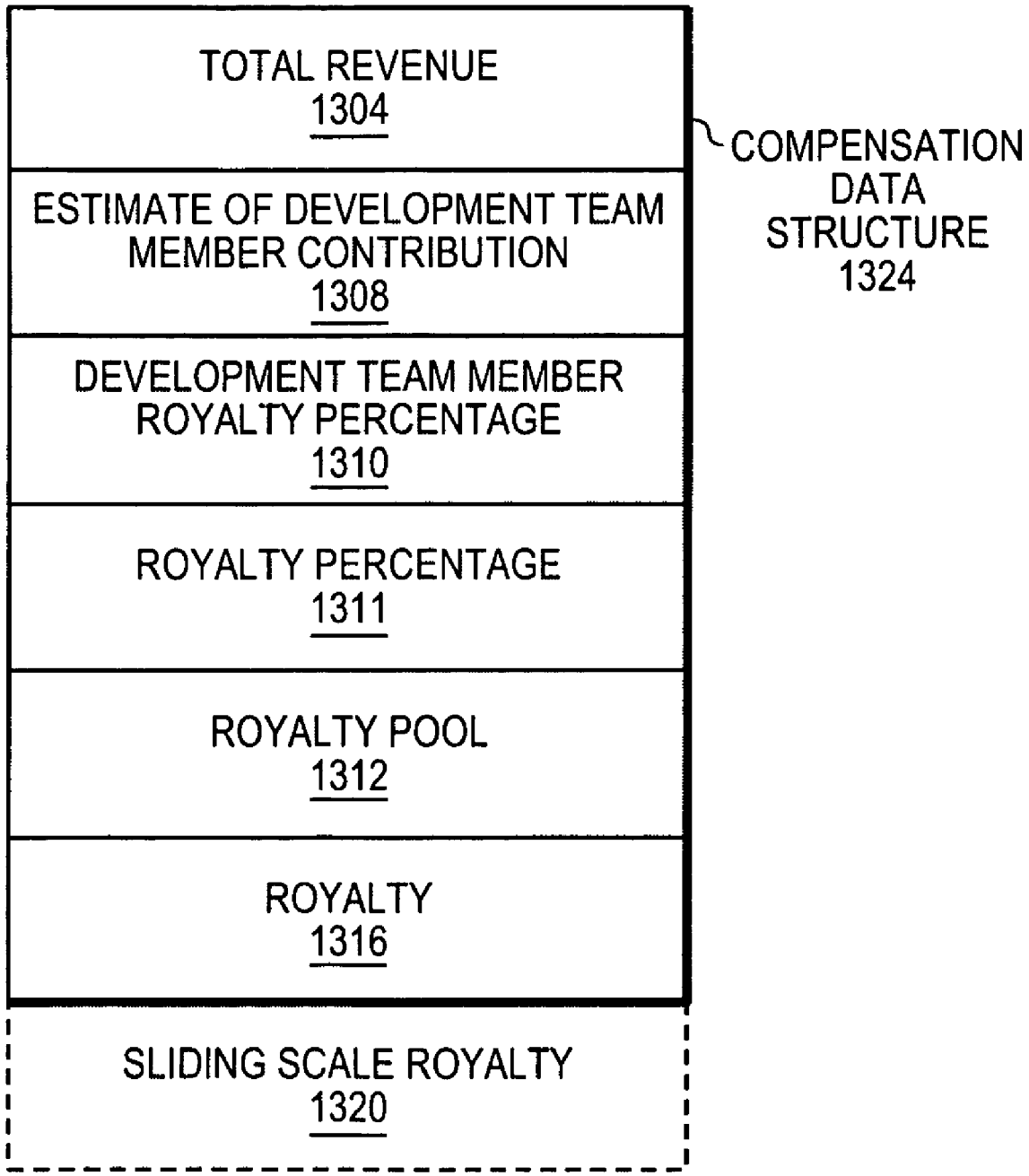
FIG. 13 is a block diagram of an embodiment of a compensation data structure according to the invention.

In one embodiment and also referring to FIG. 13, the server 104 (e.g., the management subsystem 824) tracks the total revenue 1304, development team member contribution 1308, development team member royalty percentage 1310, royalty pool percentage 1311, royalty pool 1312, and royalty 1316 for the project and/or for each development team member.

In one embodiment, the contribution 1308 is a predetermined amount that is specified in advance of the development work. In another embodiment, the contribution 1308 of each member is determined by the amount of time, level of skill (determined by previous scores, contest rating, experience or a combination), or degree of effort made by the development team member. In another embodiment, the contribution 1308 is determined by the usefulness of the development team member's contribution. The expected proportional contribution of a development team member (e.g., 208, 212, 216) is the development team member's royalty percentage 1310. In one embodiment, the development team member's royalty percentage 1310 is determined by dividing the total work contribution 1308 that is expected to be required by the development team member to accomplish her task by the total work contribution that is expected to be required by all of the development team members to develop the deliverables (e.g., the component and related documentation). In the event that the component is changed, upgraded or otherwise modified, an adjustment may be made to the development team member's royalty percentage 1310 for that modified version, to reflect the new contribution division.

In one embodiment, a royalty pool percentage 1311 is selected for a product. The royalty pool percentage 1311 is a percentage of total revenues 1304 (e.g. yearly, quarterly, or monthly revenue) to be reserved for royalty payments 1316 to be made to the development team who worked on the product. In one embodiment, the anticipated royalty pool percentage 1311 for each product is set forth in the applicable specification document. In some embodiments, the royalty pool percentage 1311 may depend on other business factors, such as time or popularity of a product. The royalty pool 1312 is then the portion of revenues 1304 from a product that is to be distributed as royalty payments 1316 to the members of the development team who developed the product. In one embodiment, the royalty pool 1312 is determined by multiplying the royalty pool percentage 1311 by the total revenues 1304 received from sales or licenses of the product during a predetermined time period.

The management subsystem 824 tracks the information in the data structure 1324. In one embodiment, there are a plethora of products that are stored in the component catalog 804. Moreover, the number of people who have contributed or are contributing to one or more projects can be substantial. To track the information used to accurately determine compensation for each development team member's contribution 1308 to products, the management subsystem 824 of the server 104 is employed.

In some embodiments, the server 104 tracks and stores a sliding scale royalty 1320, which is based on a selection that a development team member can make that determines the amount of initial compensation paid to the team member (e.g., set fee) upon their agreeing to work on the project. The sliding scale royalty 1320 is described in more detail below with respect to FIG. 16. In one embodiment, the management subsystem 824 stores this information 1304, 1308, 1312, 1316, 1320 in a compensation data structure 1324. The data structure 1324 may be stored, for instance, in the server's memory, in an external memory, and/or in a persistent storage.

Figure 14:
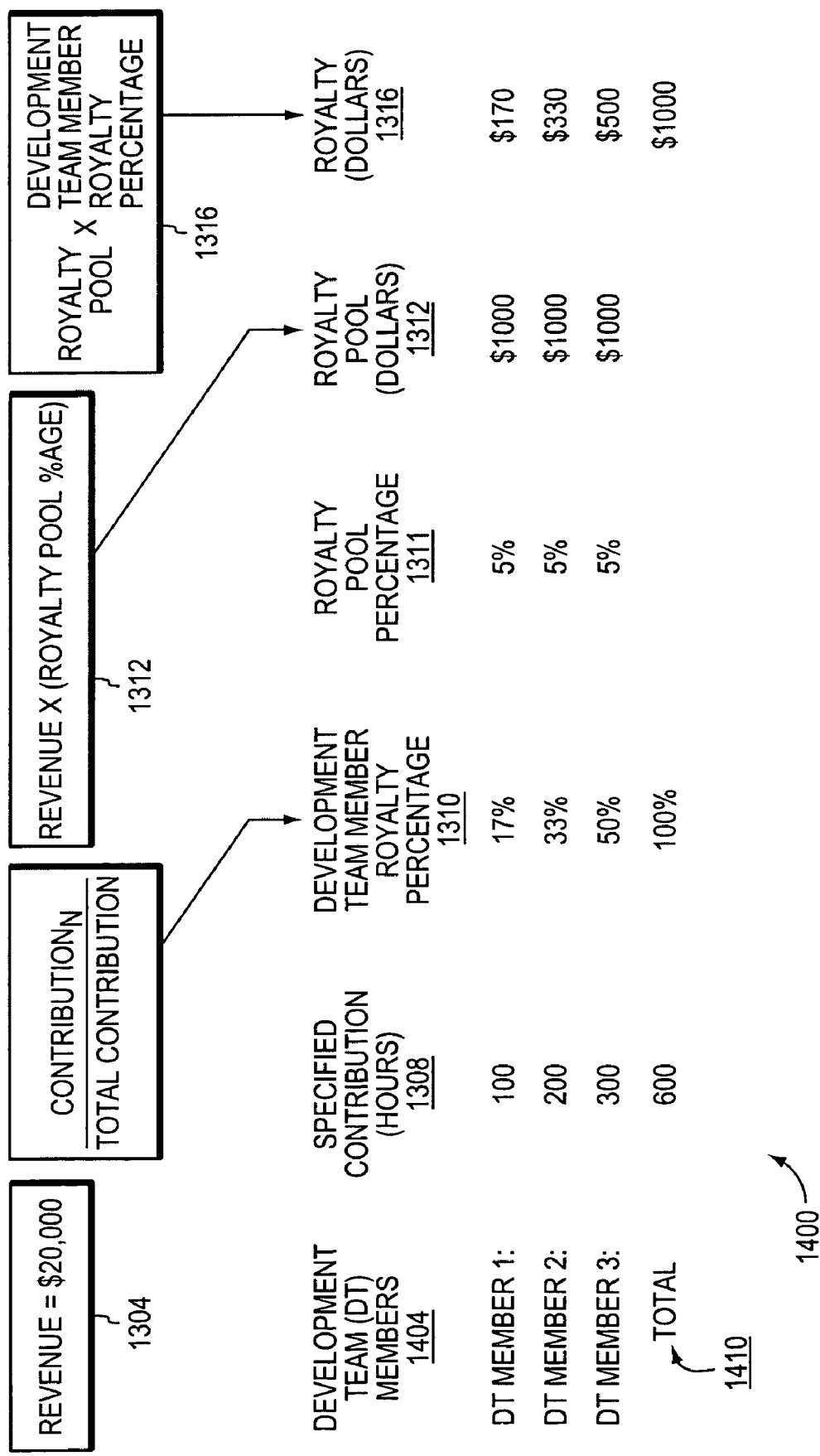
FIG. 14 is a table illustrating an embodiment of a royalty-based compensation structure for the distributed software development team according to the invention.

For example and referring to FIG. 14, a royalty compensation table 1400 includes three development team members 1404, Member1, Member2, and Member3 that are contributors on a development team. For example, Member1 could be an architect 208, Member2 could be a developer 212, and Member3 could be a quality assurance (QA) developer 216. In this embodiment, the contribution 1308 of Member1 is 100 hours, the contribution 1308 of Member2 is 200 hours, and the contribution 1308 of Member3 is 300 hours. In this example, the contribution 1308 for each member (e.g., Member1, Member2, Member3) can be determined by the expected number of hours required for each member (as determined by the product manager 204). In other embodiments, the contribution 1308 can be determined by, for instance, the actual number of hours spent, the actual amount of model or code designed written, or tested, and so on.

In this example, the total amount 1410 of contribution 1308 by the development team is 600 hours. The development team member royalty percentage 1310 is the contribution 1308 of each member divided by the total contribution. In this example, the total contribution is (100+200+300)=600 hours. The development team member royalty percentage 1310 is, then, for Member1 (100/600)=17%; for Member2 (200/600)=33%; and for Member3 (300/600)=50%.

In this example, the total revenue 1304 is $20,000. The royalty pool percentage 1311 for this product is 5%. The royalty pool 1312 is therefore ($20,000×5%=) $1,000. Thus, the royalty 1316 earned by each development team member 1404 is their royalty percentage 1310 of the royalty pool 1312. Specifically, Member1 receives ($1,000×17%=) $170, Member2 receives ($1,000×33%=) $330, and Member3 receives ($1000×50%=) $500. In some embodiments, these royalty payments 1324 would be made in a similar manner as additional revenue for the product is received.

Figure 15:
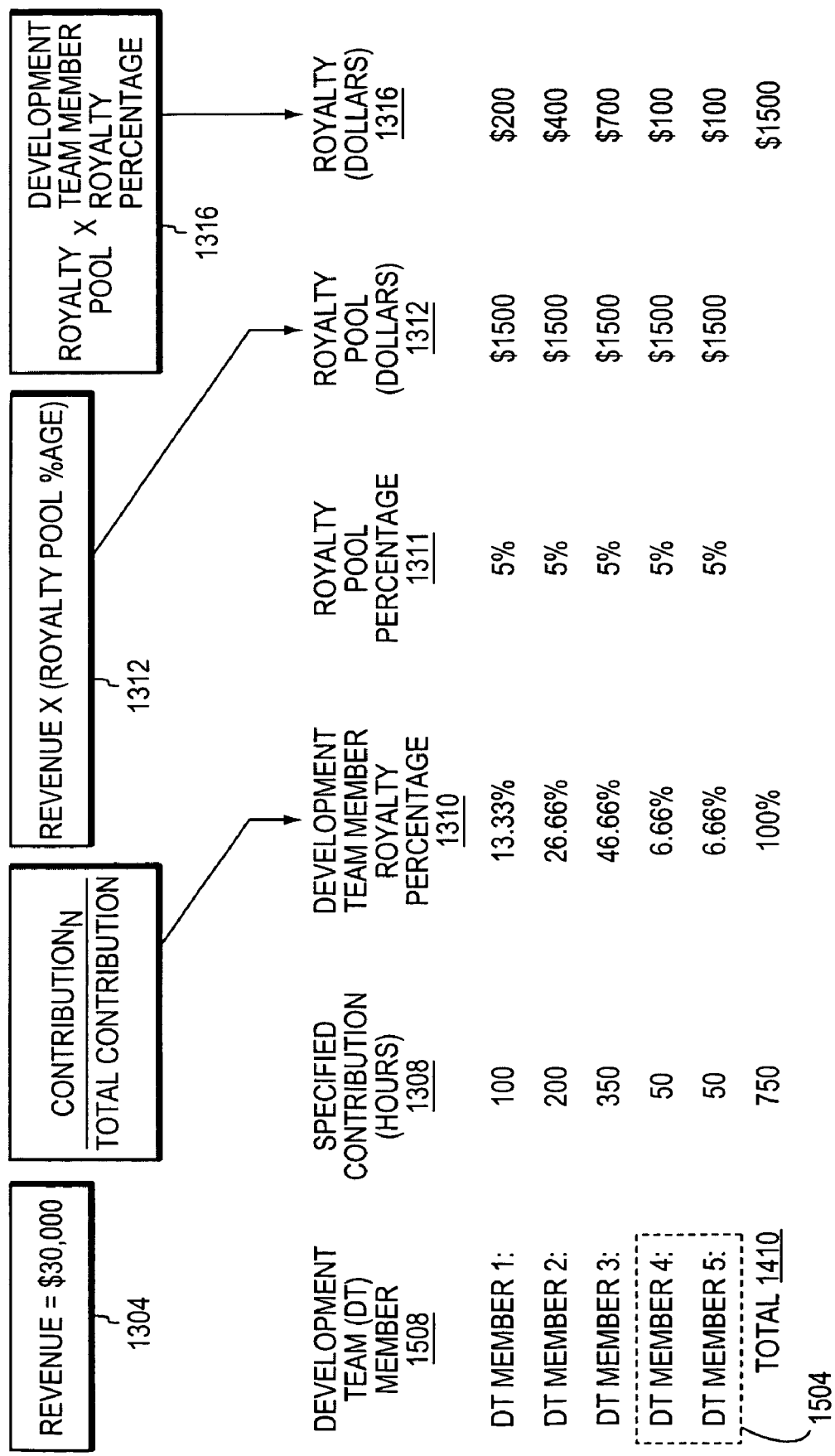
FIG. 15 is a table illustrating another embodiment of a royalty-based compensation structure for the distributed software development team according to the invention.

Referring to FIG. 15, in a continuing example, the product produced by the three team members 1404 is modified and updated into another version. The new version could be version 1.1 of the component 1116 described in FIG. 11 or integrated into another product. The additional work is performed by team members 1504 (e.g., Member4 and Member5) and also by Member3, but not Member2 and Member1. The royalties are adjusted to include the new development team members' contributions into the determination of the royalty 1316. In this example, the contribution of Member4 is 50 hours and the contribution of Member5 is also 50 hours. Thus, with the contribution of the two additional members 1504, the total 1410 of the amount of contribution increases to 750 hours. The development team member royalty percentage 1310 is the contribution of each member (e.g., Member1, Member2, Member3, Member4, Member5) divided by the total contribution.

The development team member royalty percentage 1310 is, then, for Member1 (100/750)=13.33%; for Member2 (200/750)=26.66%; for Member3 (350/750)=46.66%; for Member4 (50/750)=6.66%, and for Member5 (50/750)=6.66%.

Further, in this example, the total revenue 1304 generated for the modified product is $30,000. The royalty pool percentage 1311 for this product is 5%. The royalty pool 1312 is therefore ($30,000×5%=) $1500. Each of the development team members 1508 receives their royalty percentage 1310 of the royalty pool 1312: Member1 receives ($1500×13.33%=) $200. Member2 receives ($1500×26.66%=) $400. Member3 receives ($1500×46.66%=) $700, which is higher than the previous royalty 1316 that Member3 had previously received before Member3's additional contribution 1308. In some embodiments, these royalty payments 1316 would be made in a similar manner as additional revenue for the product is received.

Figure 16:
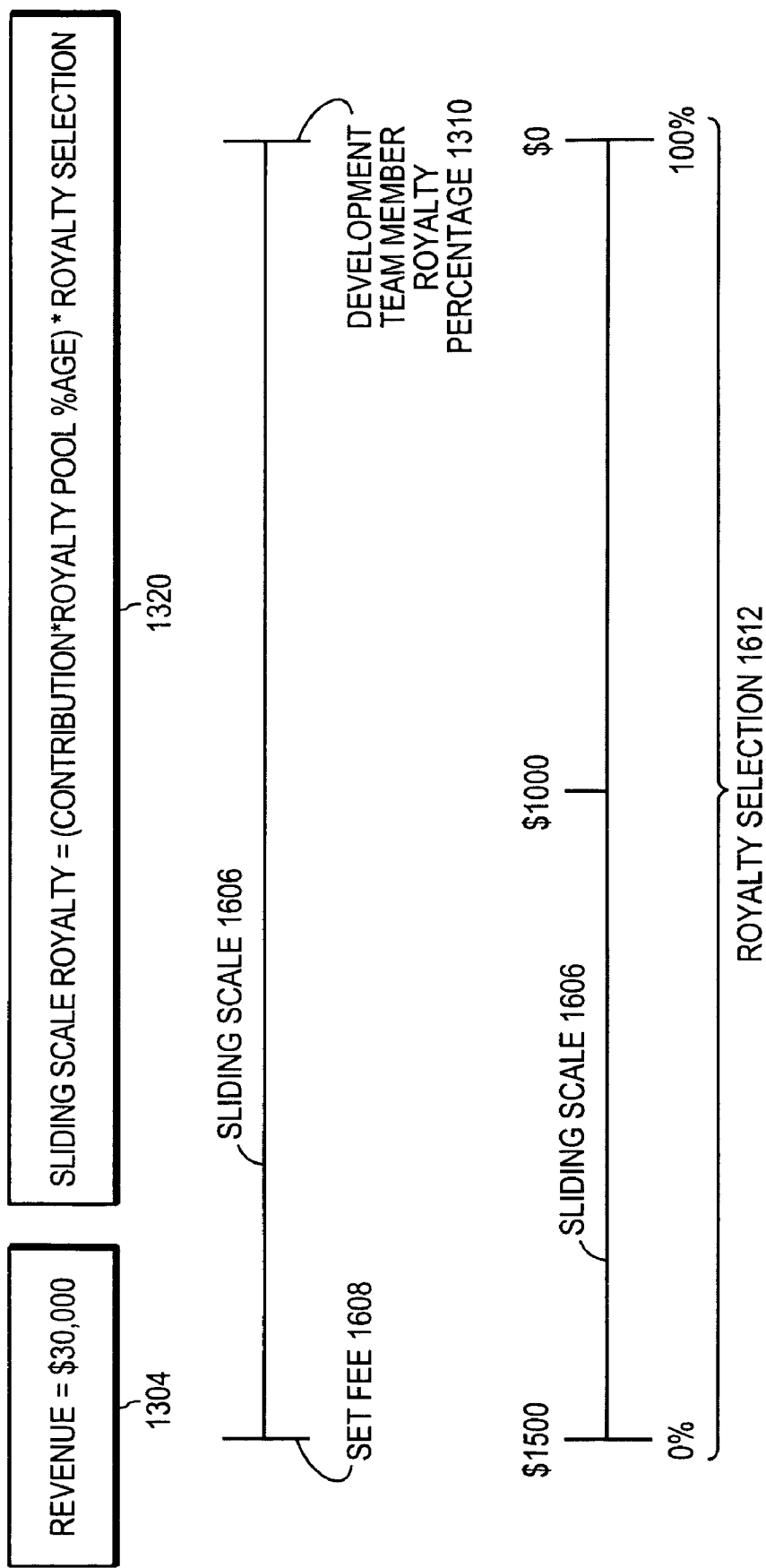
FIG. 16 is a linear diagram illustrating an embodiment of a sliding scale royalty compensation structure supported by the server according to the invention.

Also referring to FIG. 16, in some embodiments the development team members can adjust the amount of revenue that they receive (as royalties 1316) by adjusting their sliding scale royalty 1320. Specifically, the server 104 (e.g., the product manager 204) can implement a sliding scale 1606 that enables a team member to choose the amount of a set fee 1608 and development team member royalty percentage 1310 such that the development team member can accept more or less risk of the success of the product. An increased fee 1608 will result in a decreased royalty and vice-versa, and, therefore, reduces the received royalties 1316. Thus, the amount of the fee 1608 that the team member chooses corresponds with a royalty selection 1612. The endpoints of the sliding scale 1606 are the maximum values of the set fee 1608 and the development team member royalty percentage 1310 that the team member can receive for their contribution 1308 to the project. In the sliding scale 1606 shown, the values of the set fee 1608 are represented on the top half of the sliding scale 1606 and the development team member royalty percentages 1310 are represented on the bottom half of the sliding scale 1606. In one embodiment, when a fee is requested, the royalty potential of the team member is adjusted due to the choice of the set fee. To determine the sliding scale royalty 1320, which would replace the royalty 1316 received by the team member, the server 104 multiples the development team member royalty percentage 1310 of the team member with the royalty pool 1312 and with the royalty selection 1612 made by the team member. Thus, the sliding scale royalty 1320 would be the total revenue 1304 multiplied by the royalty pool percentage 1311 multiplied by the development team member royalty percentage 1310 multiplied by the royalty selection percentage 1612.

Using the example illustrated in FIG. 16 with respect to Member2, Member3, and Member5 of FIG. 15, if Member2 chooses to receive 100% of his compensation in a set fee 1608, then Member2 will receive 0% of the royalties otherwise applicable. Thus, Member2 has a new sliding scale royalty 1320, which replaces the royalty 1316 shown in FIG. 15, of (26.66%*1500*0%=) zero, as Member2 chose all of his royalties as a set fee 1608.

In this example, Member3 chooses a maximum royalty selection 1612 (e.g., 100%). Consequently, Member3's sliding scale royalty 1320 is (46.66%*1500*00%=) $700. In another embodiment, Member5 chooses to receive 50% of the possible fee 1608 and 50% royalty 1316. Thus, Member5's sliding scale royalty 1320 is (6.66%*1500*50%=) $50.

In one embodiment, the amount of the set fee 1608 directly relates to the reduction in the development team member royalty percentage 1310. Thus, a 20% increase in the set fee 1608 consequently reduces the development team member royalty percentage 1310 by 20%. In other embodiments, the change in set fee 1608 is not directly related to the change in the development team member royalty percentage 1310. For example, the server 104 may multiply a constant times the increase in the fee 1608 to make even a slight increase in the fee 1608 correspond to a large increase in the development team member royalty percentage 1310 adjusted for the expected risk. Alternatively, the server 104 may assign a constant which applies an inverse relationship to the change in the development team member royalty percentage 1310 from a change in the set fee 1608. Moreover, any relationship can exist between the set fee 1608 and the development team member royalty percentage 1310. Thus, the server 104 can apply one or more mathematical functions to determine the change in one variable with respect to a change in the other variable.

In one embodiment, the development team member royalty percentage 1310 and royalty pool percentage 1311 (e.g., 5% in previous two examples) may differ for each applicable product and each are subject to upward or downward adjustment by the server 104 at any time. In further embodiments, the product manager 204 and/or the architect 208 can vary these percentages 1310, 1311.

Furthermore, in one embodiment, revenue can be measured before expenses (e.g., gross revenue). In another embodiment, revenue can be determined after expenses (e.g., net revenue, commissions, etc.).

In one exemplary embodiment, the distributed software development system 101 is employed in the bio-technology industry. A first bio-tech company develops a new set of molecules, referred to below as set A, B, and C, and believes that one or more of the molecules can be effective against a particular disease, referred to below as disease X. However, the bio-tech company does not have the protein data that is used to determine if molecule A, B, and/or C are effective against disease X. In one embodiment, the product manager 204 researches the industry and, subsequently, a development team adds a software component that models the characteristics of each molecule into the component catalog 804. In some embodiments, the development team also creates one or more components that model diseases, such as disease X. The bio-tech company may view the components in the component catalog 804 and determine to use one or more of the components to, for example, model molecular interactions and determine the effectiveness of a molecule on a particular disease. In some embodiments, the server 104 produces components that provide a data warehouse for data about a particular gene or molecule. In one embodiment, the bio-tech company uses a component to read data out of a bio-tech machine that reads data of cells and/or genes. The component can also store the data read out of a bio-tech machine.

In general, in one aspect, the invention relates to a method for determining a royalty for a first contributor to a cooperatively developed product that is developed by the first contributor and at least one other contributor. The Method includes receiving a value indicative of the contribution made by each of the first contributor and each of the at least one other contributor to the cooperatively developed product. The method includes calculating the total contribution made by the contributor and the at least one other contributor by summing the received values. The method includes determining a developer royalty percentage for the first developer based on the ratio of the determined first contributor's contribution value to the calculated total contribution. The method includes allocating a royalty pool for the cooperatively developed product out of revenue received for the cooperatively developed product; and determining a royalty amount for the first contributor by multiplying the royalty pool by the developer royalty percentage.

In one embodiment, allocating a royalty pool includes specifying a royalty pool percentage for the cooperatively developed product, and multiplying revenue received for the cooperatively developed product by the royalty pool percentage. In various embodiments, the revenue received can be the revenue before or the revenue after deducting expenses.

Although described here with reference to software, and useful when implemented with regard to software components, the cooperatively developed product can be any sort of tangible or intangible object that embodies intellectual property. In one embodiment, the product includes at least one computer software component. In one such embodiment, the product includes a computer application program made up of at least one computer software component. In other embodiments, the product includes at least one of an integrated circuit design and a computer hardware device. In one embodiment, the contribution is at least one of product management, design, architecture, coding, and quality assurance testing.

In one embodiment, the receiving step comprises receiving from at least one of a system administrator, keyboard input, or a data store (e.g. hard disk, memory), and a software object. In one embodiment, the method is performed by a computer in response at least in part to input of contributor contribution values for the cooperatively developed work. In one embodiment, the value indicative of contribution is a predetermined value based on estimates of work required for a specified contribution. In another embodiment, the value indicative of contribution is based on measuring actual contribution. (e.g. lines of code, hours spent). In various embodiments, the steps of the method can be used for follow-on or modified products that include the contribution of additional contributors. In such a case, the value indicative of contribution can be either the contribution to the original product or the contribution to the follow-on or modified product.

In general, in another aspect, the invention relates to a system that can perform the method steps for many contributors and many products. The system is able, using the information and techniques and described herein, to track the information associated with these products and developers to allocate revenue as royalties for the contributors. In general, in another aspect, the invention relates to a system for facilitating distributed component development, including a component catalog, a distributed development environment, and a royalty calculation system.

In general, in another aspect the invention relates to a component catalog system that includes local component storage for storing components and information about the components, an user interface module for providing information about components, an update tracking module for tracking updates made to the components, a dependency tracking module for tracking component dependencies, and an integration module for identifying components that can be integrated. In one embodiment, the system further comprises a remote module for providing information about components stored on a remote system, and making the components available to users of the component catalog as if they were contained in the local component storage.

What is claimed is:

1. A method for facilitating the distributed development of software programs comprising:
    (a) providing skill ratings for a plurality of developers;
    (b) communicating specifications for a software program to a subset of the plurality of developers;
    (c) receiving at least one submission in response to the communicated specifications;
    (d) deriving a score using one or more scorecards for the at least one submission from a review of the submission that includes evaluation of compliance with the communicated specifications by a plurality of review board members in a coding competition, wherein one or more of the review board members are each rated developers not including the developer who submitted the at least one submission;
    (e) deriving updated skill ratings for the developers based on the derived scores and the provided skill ratings; and
    (f) selecting one of the at least one submission for inclusion in a software repository based on its derived score; and
    (g) storing the at least one submission selected in the software repository.

2. The method of claim 1 wherein the skill rating is based on the results of a coding competition.

3. The method of claim 2 wherein the coding competition is an online coding competition.

4. The method of claim 1 wherein the skill rating is based on prior submissions of a design for a software program.

5. The method of claim 1 wherein the skill rating is based on prior submissions of a software program.

6. The method of claim 1 wherein the specifications are for the design of a software program.

7. The method of claim 1 wherein the specifications are for the development of a software program.

8. The method of claim 1 wherein the software program is a software component.

9. The method of claim 1 wherein the software program can be one or more of: a software component, a software application, a combination of software components, or a software module.

10. The method of claim 1 wherein the subset of the plurality of developers is determined based on the skill ratings of the developers.

11. The method of claim 10 wherein the subset of the plurality of developers is determined based on which developers have a rating.

12. The method of claim 1 wherein the submission is a design for a software program.

13. The method of claim 1 wherein the submission is computer code for a software program.

14. The method of claim 1 wherein the developer is a software designer.

15. The method of claim 1 wherein the developer is a software programmer.

16. The method of claim 1 wherein the step of deriving a score for the at least one submission further includes reviewing the submission by a developer other than the developer who submitted the submission.

17. The method of claim 1 wherein the submission must receive a minimum score to be selected for inclusion into the software repository.

18. The method of claim 1 wherein submissions included in the software repository are certified to operate in computing environments different from the computing environment used for the original submission.

19. The method of claim 1 wherein the review comprises an aggregation of multiple reviews from the plurality of review board members.

20. The method of claim 1 wherein the review is based at least in part on a scorecard.

21. The method of claim 1 further comprising screening the at least one submissions prior to deriving a score to determine if the at least one submissions meet a set of minimum requirements.

22. A system for facilitating the distributed development of software programs comprising:
    a server for communicating specifications to a plurality of developers;
    a receiving module for receiving software programs developed by the developers;
    a scoring module for facilitating the evaluation of the received software programs in a coding competition by a plurality of review board members using one or more scorecards, wherein the evaluation includes evaluation of compliance with the communicated specifications, and wherein one or more of the review board members are each rated developers not including developers who submitted the received software programs; and
    a rating engine for rating the skills of software developers based on a previous skill rating and evaluations of the received software programs facilitated by the scoring module; and
    a software repository for storing a subset of the received software programs based on the evaluations.

23. The system of claim 22 further comprising a reviewing module for allowing developers to review submissions submitted by other developers.

24. The system of claim 22 further comprising an online showroom for displaying the software programs stored in the repository.

25. The system of claim 22 further comprising sample applications built at least in part from the software programs stored in the repository.

26. The system of claim 22 further comprising a demonstration module for demonstrating the features of the software programs stored in the repository.

27. The system of claim 22 further comprising a calculation module for allocating revenue among a development team.

28. The system of claim 27 wherein the calculation module allots proceeds based at least in part on the rating of the developers.

29. The system of claim 27 wherein the calculation module allots proceeds based at least in part on the number of hours the at least one of the plurality of developers spent coding the software program.

30. The system of claim 27 wherein the calculation module allots proceeds based at least in part on the number of times the software component is distributed.

* * * * *